(12) United States Patent
Matsumoto

(10) Patent No.: US 7,623,695 B2
(45) Date of Patent: Nov. 24, 2009

(54) IMAGE PROCESSING METHOD AND COMPUTER READABLE MEDIUM

(75) Inventor: Kazuhiko Matsumoto, Tokyo (JP)

(73) Assignee: Ziosoft, Inc., Tokyo (JP)

( * ) Notice: Subject to any disclaimer, the term of this patent is extended or adjusted under 35 U.S.C. 154(b) by 713 days.

(21) Appl. No.: 11/457,264

(22) Filed: Jul. 13, 2006

(65) Prior Publication Data
US 2007/0025685 A1 Feb. 1, 2007

(30) Foreign Application Priority Data
Jul. 26, 2005 (JP) .............................. 2005-215522

(51) Int. Cl.
G06K 9/00 (2006.01)
G11B 27/00 (2006.01)
(52) U.S. Cl. ........................................ 382/128; 386/52
(58) Field of Classification Search ................ 382/100, 382/128, 168, 276, 309; 386/4, 52, 55; 358/452, 358/537; 715/223, 235, 255, 723, 732; 717/110
See application file for complete search history.

(56) References Cited
U.S. PATENT DOCUMENTS
4,717,971 A * 1/1988 Sawyer ..................... 386/55

FOREIGN PATENT DOCUMENTS
JP 10-222466 8/1998
JP 2002-272701 9/2002
WO 2005/045595 A2 5/2005

OTHER PUBLICATIONS
Concise Statement for Japanese Reference 10-222466 and Reference 2002-272701.
Japanese Office Action for JP 2005-215522.

* cited by examiner

Primary Examiner—Abolfazl Tabatabai
(74) Attorney, Agent, or Firm—Pearne & Gordon LLP

(57) ABSTRACT

In a screen image for a user to operate other processing unit while one processing unit is in an editing state, icons of [A: EDITING-COMPLETE], [B: EDITING-HALT], [C: EDITING], [D: EDITING-COMPLETE], [E: EDITING-HALT (CALCULATING)] and [OPERATION GUI] are included. The [OPERATION GUI] shows a GUI for operating the processing unit corresponding to [C: EDITING]. In an image processing method, the "editing-halt" state can be provided, enabling the user to operate the other processing unit while one processing unit is in the editing state. Accordingly, while the user is operating a complicated processing unit such as a cardiac function analysis, the user can once stop editing the cardiac function analysis as required, and can execute a voxel value measurement, mask setting processing, etc., for example, and then can resume editing of the cardiac function analysis.

13 Claims, 38 Drawing Sheets

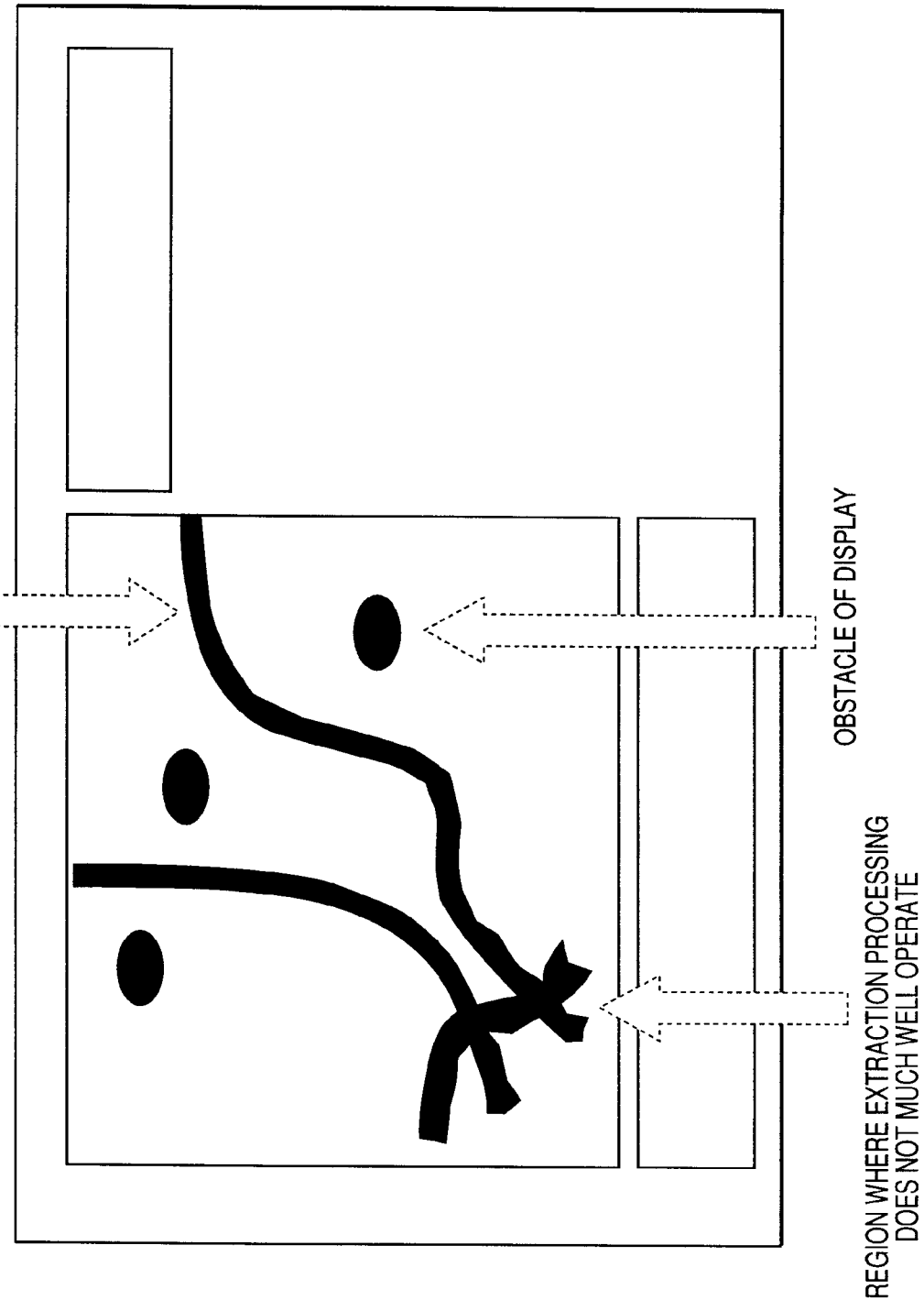

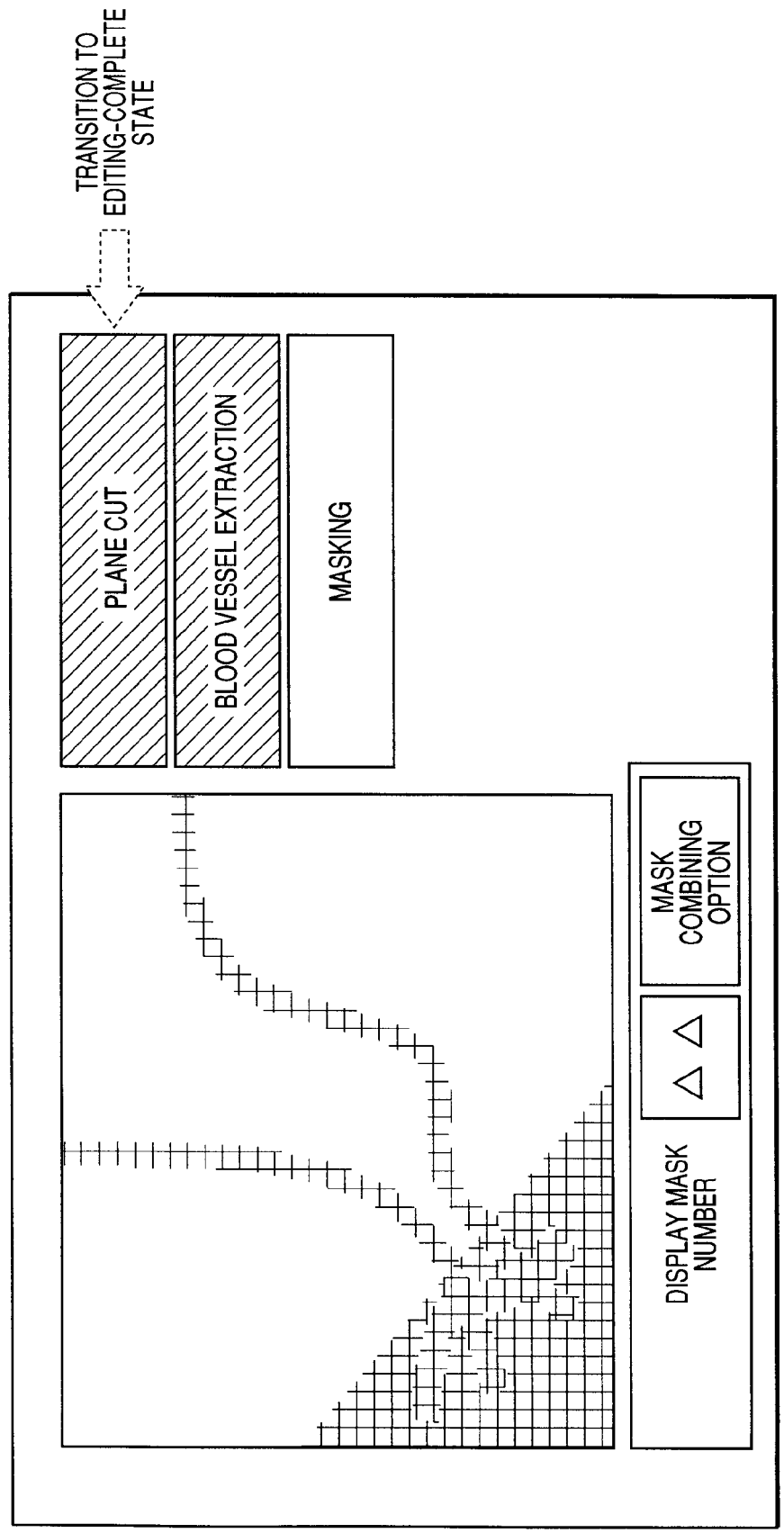

FIG. 37

| USE-SOURCE<br>USE-DESTINATION | MASK | BLOOD VESSEL REGION EXTRACTION | REGION INFORMATION | PATH INFORMATION | STENOTIC RATE MEASUREMENT OF BLOOD VESSELS | PROFILE DISPLAY | PLANE CUT | CT VALUE MEASUREMENT |
|---|---|---|---|---|---|---|---|---|
| MASK | OPTIONAL | YES | YES | · | · | · | · | · |
| BLOOD VESSEL REGION EXTRACTION | NO | · | · | · | · | · | YES | NO |
| REGION INFORMATION | · | · | · | · | · | · | · | · |
| PATH INFORMATION | · | · | · | · | · | · | · | · |
| STENOTIC RATE MEASUREMENT OF BLOOD VESSELS | · | OPTIONAL | · | · | · | · | · | · |
| PROFILE DISPLAY | · | YES | · | YES | · | · | · | · |
| PLANE CUT | · | · | · | · | · | · | · | · |
| CT VALUE MEASUREMENT | · | · | · | · | · | · | · | · |

IMAGE PROCESSING METHOD AND COMPUTER READABLE MEDIUM

This application claims foreign priority based on Japanese Patent application No. 2005-215522, filed Jul. 26, 2005, the contents of which is incorporated herein by reference in its entirety.

BACKGROUND OF THE INVENTION

1. Field of the Invention

This invention relates to an image processing method and a computer readable medium in an image processing apparatus using volume data.

2. Description of the Related Art

A design and design data of various industrial products and images for entertainment are analyzed by editing and a numeric calculation using a computer. FIG. 38 shows an example image of stress simulation by CAE (Computer aided-engineering) system. By specifying a parameter of a model on a screen with an object management GUI (Graphical User Interface), a safety factor and a deformation under stress of a component or an assembly under a structure load can be obtained.

In such CAD (Computer aided-design)/CAE (Computer aided-engineering) software, a sequence of operation can be viewed as a processing unit, and the sequence of operation that is once completed is managed as an object (for example, caption object, line object or stress simulation) and the processing unit can be reedited or redone later. The GUI for operating an individual processing unit is provided for each type of the processing unit (processing type).

On the other hand, CT (Computed Tomography) apparatus, MRI (Magnetic Resonance Imaging) apparatus, and PET (positron-emission tomography) apparatus, etc., for directly observing an internal structure of a human body, are used as a medical image processing apparatus. Medical diagnosis using tomographic images of a living body is widely conducted. Further, in recent years, as an art for visualizing a three-dimensional structure of the inside of a human body that is too complicated to understand just by using the tomographic images of the human body, for example, volume rendering has been used for medical diagnosis. In volume rendering, an image of a three-dimensional structure of an object is directly rendered from three-dimensional digital data of the object that are obtained from the CT apparatus.

As medical image processing becomes complicated and sophisticated, content of each processing unit in the medical image processing also becomes complicated and advanced. In such a medical image processing apparatus, a plurality of processes can be divided into separate processing units (such as operation and calculation), and a user operates the plurality of processes sequentially one at a time to conduct a diagnosis.

For example, while operating a certain processing unit, in a case where the user requires information other than the information being used in the processing unit under operation, or in a case where a user wants to change information in another processing unit which depends on the processing unit under operation, the processing unit under operation needs to be once completed, or editing information needs to be freed.

A possible reason why a transition to the next process cannot be made unless the processing unit under operation is once completed or unless the intermediate result is freed is that, in case of the medical image processing, the processing is complicated and a calculation amount required for one processing unit is large, or the processing units depend on each other. Furthermore, the possible reason is also that since in a medical image, data amount of volume data and the calculation amount involved therein are enormous, and the object is a complicated human body. Unlike an industrial product which can be disassembled to each component, there is a limit to disassemble a human body into each part, where each part of a human body is related to each others and each part can not be separated exactly in a image. Thus, iterative operation between several processing units is required.

SUMMARY OF THE INVENTION

It is an object of the invention to provide an image processing method and a computer readable medium for image processing capable of executing a plurality of processing units in parallel in medical image processing by using volume rendering.

In some implementations, an image processing method of the invention, of managing a plurality of processes using volume data as a plurality of processing units for each processing type, the image processing method comprises: managing relationships among the plurality of processing units, wherein the plurality of processing units can respectively take an editing-halt state in which an internal state of the processing unit is frozen.

According to the configuration, in the image processing using the volume data, the relationship among the plurality of processing units, each of which can take the editing-halt state, are managed, whereby the plurality of processing units can be executed in parallel.

In the image processing method of the invention, the plurality of processing units can respectively take at least one of an editing state in which the processing unit is focused on and an editing-complete state in which processing of the processing unit is completed.

In the image processing method of the invention, while a first processing unit of the plurality of processing units is in the editing-halt state, a second processing unit of the plurality of processing units takes the editing state.

In the image processing method of the invention, a number of processing units of the plurality of processing units in the editing state is equal to or less than a predetermined number.

In the image processing method of the invention, in a case where a first processing unit of the plurality of processing units includes a second processing unit of the plurality of processing units, and a third processing unit of the plurality of processing units uses the second processing unit, the third processing unit uses the first processing unit so as to use the second processing unit.

In the image processing method of the invention, in a case where a first processing unit of the plurality of processing units uses a second processing unit of the plurality of processing units, and a third processing unit of the plurality of processing units uses the second processing unit, the third processing unit uses the first processing unit so as to use the second processing unit.

In the image processing method of the invention, in a case where a first processing unit of the plurality of processing units uses a second processing unit of the plurality of processing units, and the second processing unit is modified, the first processing unit is modified based on the processing type of the first processing unit and the processing type of the second processing unit.

In the image processing method of the invention, a result of at least one of the plurality of processing units is not displayed on a screen.

In the image processing method of the invention, processing of a processing unit of the plurality of processing units is continued when the processing unit is in the editing-halt state.

In the image processing method of the invention, in a case where a first processing unit of the plurality of processing units includes a second processing unit of the plurality of processing units, and the first processing unit is in the editing-halt state, a third processing unit of the plurality of processing units uses the first processing unit so as to use the second processing unit.

In the image processing method of the invention, in a case where a first processing unit of the plurality of processing units uses a second processing unit of the plurality of processing units, and the first processing unit is in the editing-halt state, a third processing unit of the plurality of processing units uses the first processing unit so as to use the second processing unit.

In the image processing method of the invention, in a case where a first processing unit of the plurality of processing units is in the editing-halt state, a use relationship of a second processing unit of the plurality of processing units with respect to the first processing unit is set.

In the image processing method of the invention, in a case where a first processing unit of the plurality of processing units uses a second processing unit of the plurality of processing units, and the second processing unit is in the editing state, the first processing unit uses information of the second processing unit when an information request occurs in the first processing unit, and the information before editing operation of the second processing unit started is obtained.

In the image processing method of the invention, a state of the processing unit is displayed on a screen.

In some implementations, a computer readable medium of the invention having a program including instructions for permitting a computer to manage a plurality of processes using volume data as a plurality of processing units for each processing type, the instructions comprises: managing relationships among the plurality of processing units, wherein the plurality of processing units can respectively take an editing-halt state in which an internal state of the processing unit is frozen.

According to the invention, in the image processing using the volume data, the relationship among the plurality of processing units, each of which can take the editing-halt state, are managed, whereby the plurality of processing units can be executed in parallel.

BRIEF DESCRIPTION OF THE DRAWINGS

FIG. 12 is detailed schematic representation 1 of a fourth embodiment.

FIG. 21 is detailed schematic representation 10 of a fourth embodiment.

FIG. 37 is a schematic representation showing an example of a dependence update table (use relationship) in a fourth embodiment.

DESCRIPTION OF THE PREFERRED EMBODIMENTS

Figure 1:
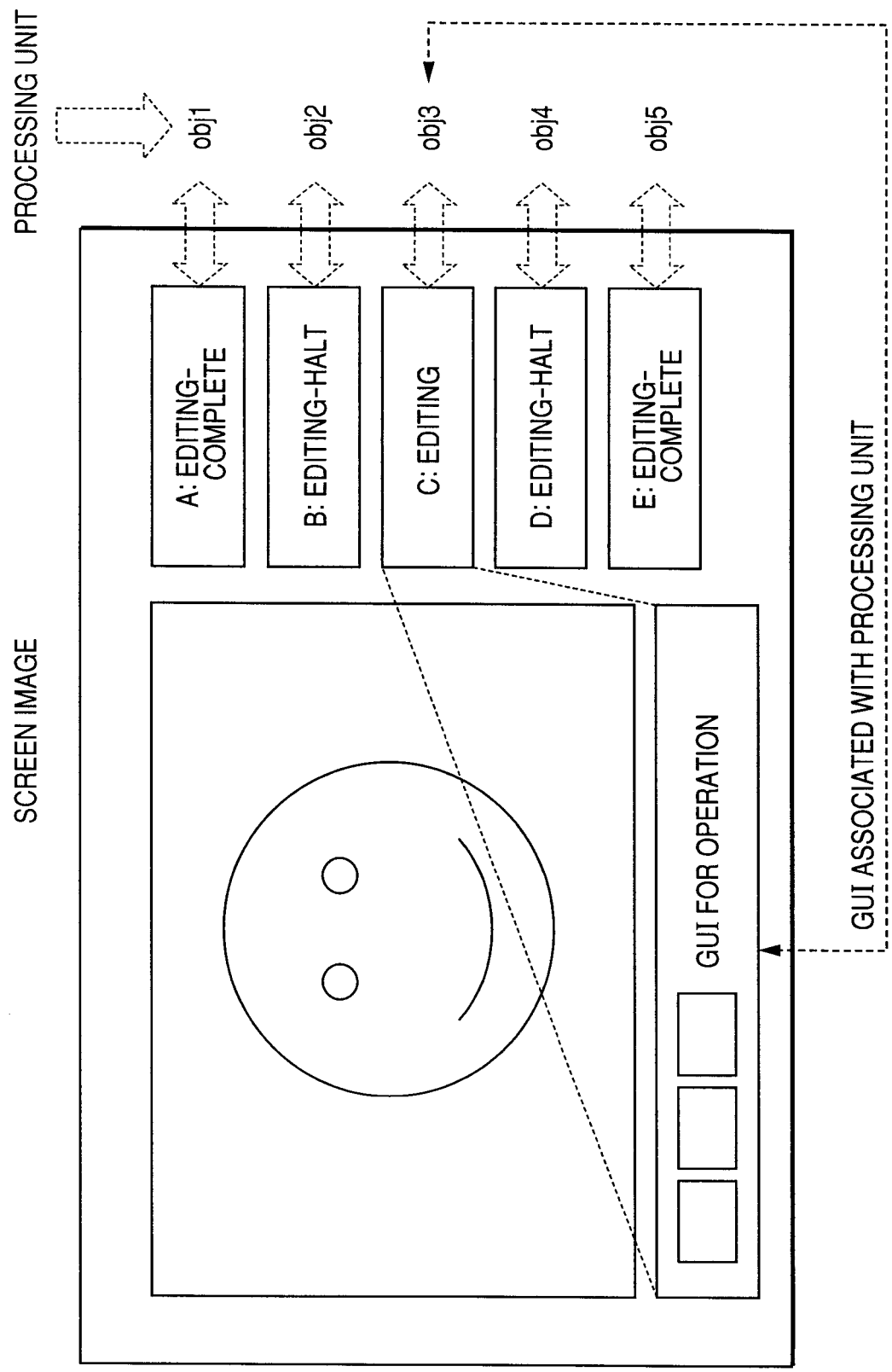
FIG. 1 is a drawing showing a screen image displayed in an image processing method according to embodiments of the invention.

An image processing method according to an embodiment of the invention aims at editing another processing unit by bringing a processing unit under operation to an editing-halt state (corresponding to first embodiment); generating an exclusive processing unit (corresponding to second embodiment); when complicated processing units have use relationship with each other, selecting actually using information and automatically determining the using information from the processing units (corresponding to third embodiment); and further, managing processing order of a plurality of processing units (corresponding to fourth embodiment).

An observation object in the image processing method according to embodiments of the invention is volume data. A processing unit has three editing states, which are editing, editing-halt and editing-complete. The processing unit is assigned with a GUI corresponding to the editing state and a processing type of the processing unit.

The "editing" state is a state in which the GUI for editing is displayed so that a user can operate the processing unit. When the processing unit is in the editing state, the user can modify, add, etc., a parameter of the processing unit. The "editing-halt" state is a state in which an internal state of the processing unit under operation is frozen so that the user can work on a different process. In the editing-halt state, the GUI for editing is hidden. The "editing-complete" state is a state in which processing of the processing unit is completed and an output result is obtained. A transition from the editing-complete state to the editing state can be made at any time. When the processing unit is in the editing-halt state or the editing-complete state, the user cannot change, add, etc., any parameter of the processing unit as a rule. Particularly, a difference between the editing-halt state and the editing-complete state is that the editing-complete state is a state in which the output of the processing unit is already obtained; whereas, the editing-halt state is a state in which a part of or all of the output of the processing unit is not obtained because some or all of the parameters required for the processing unit are unset, or for another reason. For example, in a case of a region extraction processing unit, when a region extraction calculation is not yet executed although the user inputs all setting values (parameters) for the calculation, or when the user does not input some of the setting values for the calculation, editing operation is frozen to be the editing-halt state. Moreover, although a result of the region extraction calculation is obtained, when the user is not satisfied with the result, the editing operation is frozen to be the editing-halt state. This is because it is worthwhile to store intermediate data, etc., which is to be required in recalculation. When the user is satisfied with the processing result of the processing unit, the processing result of the processing unit is determined as the editing-complete state. At this time, a GUI for input, and the intermediate data, etc., of the processing unit can be freed. Although the user can later reconsider and a transition from the editing-complete state to the editing state can be made for recalculation, generally this processing requires a larger number of calculation steps because the GUI for input, the intermediate data, etc., are freed. Also, when some relationship between two processing units is established, a possibility that the processing result of one or both of the processing units may be later changed can be determined based on the difference between the editing-halt state and the editing-complete state. Furthermore, a processing unit can also be deleted. In this case, not only the GUI for input and the intermediate data, but also internal data of the processing unit is all freed. However, other processing unit using the processing result of the processing unit to be deleted can generate a copy of the internal data to refer to. In this case, it is assumed that the internal data (the copy) itself in the other processing unit cannot be modified, which is convenient for the user. Instead of generating the copy of the internal data, only the modification of the internal data itself may be inhibited in the other processing unit without deleting the processing unit.

In the embodiments, the term "processing type" is a generic name for types of a sequence of operation such as cardiac function analysis, voxel value measurement and mask setting, and corresponds to what is called a class in a program. For example, "processing type" cardiac function analysis is comprised of a sequence of operation, such as "pointing cardiac valve", "determine cardiac region", "adjusting thresholds" and "execute calculation". The term "processing unit" is an individual specific processing such as a cardiac function analysis A, a cardiac function analysis B, a voxel value measurement C, a voxel value measurement D, a mask setting E and a mask setting F, and corresponds to what is called an instance in the program.

The "GUI" is an interface for operating the processing unit. The GUI can be managed on a display screen where icons representing each processing unit are arranged, and the interface for operating the processing unit is displayed corresponding to the processing unit in the editing state. The GUI is prepared for every processing type, and generated in association with the processing unit respectively. As the GUI and the processing unit are thus managed integrally, more flexible and intuitive operation is available. For example, subordinate information such as a slider position of the GUI can also be stored as information included in the processing unit to improve operability.

Next, the term "use" is described. A complicated processing unit requires a lot of input information and outputs a lot of information. For example, the complicated processing unit such as the cardiac function analysis uses measurement result information provided by the voxel value measurement processing unit as the input information for analysis, and uses region information generated by the mask setting processing unit as the input information for calculation. These cases are expressed as "the cardiac function analysis processing unit uses other processing units."

Here, the term "use-source" is the processing unit which provides outputs information to be used, and the term "use-destination" is the processing unit which requires the information as an input. In a case where the processing units have the use relationship with each other, when the use-source changes the output result, usually it is desirable that the output result of the use-destination is recalculated to update. However, updating the use-destination is not necessarily appropriate. Therefore, whether the use-destination is updated or not is switched (determined) according to the processing types of the use-source and the use-destination. Such determination processing for the switching is called "use management."

The "editing state" indicates the state of the processing unit, and includes the three editing states, which are the editing, the editing-halt and the editing-complete sates. The term "internal state" indicates a parameter, etc., in each specific processing unit. The term "inclusion" means that one processing unit inseparably contains another processing unit and has all control over it. In the use relationship, the use-destination only uses the information of the use-source. However, by the inclusion, the dependent processing unit can be caused to perform processing equally as the processing unit which is depended on. Here, "include-source" is a processing unit that includes or depends on or controls another processing unit.

On the contrary, "include-destination" is a processing unit that included by the "include-source" or is depended on by the "include-source" or controlled by the "include-source".

Next, the image processing method according to the embodiments will be discussed with reference to the accompanying drawings. FIG. 1 shows a screen image displayed in the image processing method according to the embodiments. In the screen, an icon [A: EDITING-COMPLETE] corresponds to a processing unit [obj1]; an icon [B: EDITING-HALT] corresponds to a processing unit [obj2]; an icon [C: EDITING] corresponds to a processing unit [obj3]; an icon [D: EDITING HALT] corresponds to a processing unit [obj4]; and an icon [E: EDITING-COMPLETE] corresponds to a processing unit [obj5]. An icon [GUI FOR OPERATION] is a GUI that is associated with a processing unit. Here, the GUI that is associated with the processing unit corresponding to [C: EDITING] is displayed on the screen.

First Embodiment

Figure 2:
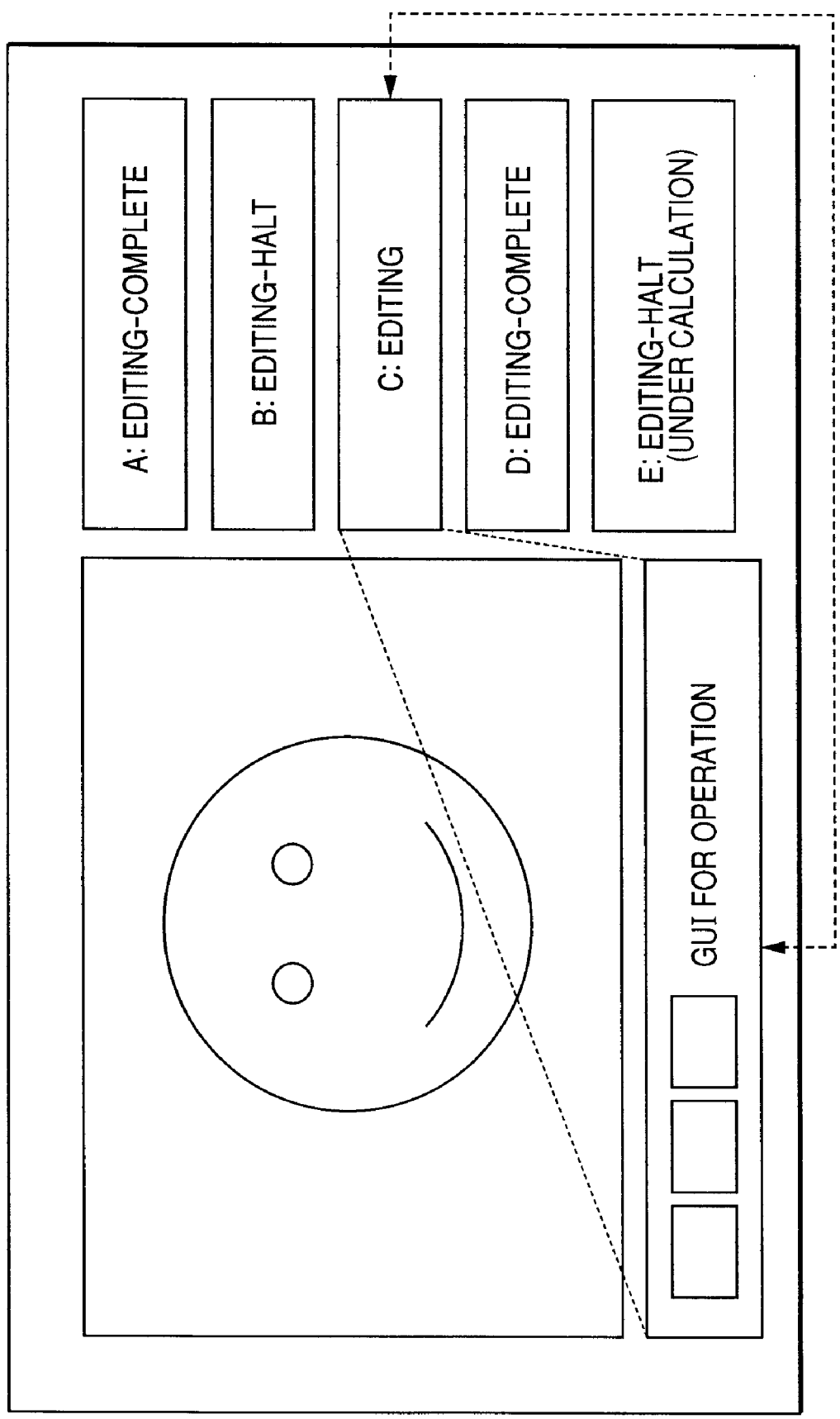
FIG. 2 is a drawing showing a screen image in which other processing unit is operated while one processing is in an editing state in a first embodiment of the invention.

FIG. 2 shows a screen image to describe a first embodiment in which another processing unit can be edited by bringing a processing unit under operation to the editing-halt state. On the screen, the icons of [A: EDITING-COMPLETE], [B: EDITING-HALT], [C: EDITING], [D: EDITING-COMPLETE], [E: EDITING-HALT (UNDER CALCULATION)] and [GUI FOR OPERATION] are displayed. In the [GUI FOR OPERATION], a GUI for operating the processing unit corresponding to [C: EDITING] is displayed. In the first embodiment, the editing-halt state is provided so that the user can operate another processing unit without completing the processing unit under operation while holding the processing unit in an intermediate state.

To make a transition from the editing state to the editing-halt state of the processing unit, parameters of the processing unit are stored. Further, temporary parameters to be freed at the time of the editing-complete state are also stored. Also, when an unset parameter exists in the parameters of the processing unit, a setting flag of the unset parameter is set to "NO". By setting the setting flag to "NO", when another processing unit uses the processing unit entering the "editing-halt" state, another processing unit can use only the parameters, which are already set, of the processing unit entering the editing-halt state, and the another processing unit can ignore the unset parameters. Further, the display content of the GUI used by the processing unit entering the editing-halt state is also stored. Accordingly, when the processing unit makes a transition from the editing-halt state to the editing state, the user can resume the editing operation immediately. In this case, when the processing unit is updated, other processing unit using the updated processing unit is notified of the update. Thus, the processing unit in the editing-halt state is used smoothly.

In the editing-halt state, although the internal state of the processing unit is frozen, the user can work on a different process while an update of the processing unit may be performed internally. For example, when the processing unit is in the editing-halt state, a calculation of an operation continues in a background. This can be done by keeping parameters which are published to other processing unit frozen. The published parameters shall be updated when the background operation is completed and the state is transited to the editing state. Furthermore, when the processing unit in the editing-halt state is the use-destination of another processing unit as the use-source, in a case where the use-source is updated, the processing unit in the editing-halt state may be updated internally since the use-destination is linked with the use-source.

In order to make a transition of the state of the processing unit from the editing-halt state to the editing state, the stored parameters of the processing unit are called up. Further, the stored temporary parameters and the stored display content of the GUI are called up.

Hitherto, the processing unit has had only the two states, which are the editing state and the editing-complete state. In the embodiment, however, the processing unit has the editing-halt state so that the user can operate another processing unit without completing the processing unit under operation. Accordingly, for example, while the user is operating a complicated processing unit such as the cardiac function analysis, the user can once halt the editing of the cardiac function analysis as required, execute the voxel value measurement, the mask setting processing, etc., for example, and then resume the editing of the cardiac function analysis. This is particularly effective in the processing unit, such as the editing of the cardiac function analysis, in which the processing is enhanced by using other processing units such as the voxel value measurement and the mask setting processing.

For example, in an image processing apparatus of CAD, all processing units are compact and operations of a processing unit are completed fast. This is unlike a processing unit which requires complicated operation such as the cardiac function analysis in medical application. For example, when the processing unit is a graphic drawing processing unit, deleting the processing unit under operation does not cause much actual damage since the operation of the graphic drawing processing unit is complete in several seconds. In addition, assuming that once the editing of the processing unit is completed, later the processing unit can be re-edited.

Particularly, for example, considering a case where a screw object is generated in CAD, the screw object is generated (entering an "editing-complete" state) after necessary parameters such as nominal size, length, etc., of the screw are inputted (editing) and determined. When the user later wants to change the length, etc., of the screw, a transition from the editing-complete state to the editing state is made for correction.

However, the processing unit in a medical image apparatus, such as the cardiac function analysis, takes time in editing operation, and in addition, the processing unit may use other processing unit. In this case, it is not preferred to delete the processing unit under operation when the user wants to replace or edit the use-destination. That is, it is desirable to resume the processing unit after halting editing in a state that the necessary parameters for completing the processing unit are not yet obtained.

According to the embodiment, in the processing unit which performs complicated calculation, other operation can be performed in a state that the processing of the processing unit is once halted. The processing of the processing unit in the editing state can be temporarily halted, meanwhile a new processing unit is generated, and the processing unit in the editing-halt state may use the new processing unit.

On the other hand, in a raster-based image software such as a photo-retouching software, UNDO (reverting to the preceding state before the execution of the processing) can be executed. However, it is impossible to extract and re-edit only an arbitrary processing. This is because, in the raster-based image software, one processing depends on all the previous processing results, and change in a processing under operation has an affect on the later processing, which makes it difficult to manage the change and the dependency.

In the embodiment, it is considered that the medical image apparatus using volume data have both characters: a character of a processing unit as an independent object of a vectorbased software, such as CAD, the processing of the processing unit based on inspection information, markers, etc.; and a character of a processing unit of a raster-based image software, the processing of the processing unit based on volume data and mask data.

In the embodiment, in the processing unit in the "editing-halt" state, all parameters are frozen, but the parameters that can be derived from the parameters that are already acquired can be calculated automatically in the background. For example, when the region extraction processing unit enters the "editing-halt" state after the user inputs the parameters necessary for region extraction in the region extraction processing unit and before the region extraction calculation is performed, automatically the region extraction calculation can be performed. In doing so, it can be expected that when the user restores the region extraction processing unit to the "editing" state, the region extraction calculation desired by the user is complete, and thus it is effective.

In the embodiment, when a use-destination processing unit in the "editing-halt" state or in the "editing-complete" state performs calculation by using information of a use-source processing unit, in a case where the use-source is in the "editing" state, the parameters of the use-source just before the use-source enters the "editing" state can be used. This is because it may be appropriate to use the parameters just before the use-source enters the "editing" state, which are more stable than the parameters of the use-source which is in the "editing" state and is in an unstable state. This determination is made by the relationship between the processing types of the processing units having the use relationship.

In the embodiment, each processing unit may be undisplayed (hidden). For example, when a path line, an outline of the extraction result, the calculation result of a calcification rate measurement of blood vessels, etc., is constantly displayed on the image, observation and operation by the user are hindered. When one processing unit is hidden, the processing unit itself exists internally. Thus, when the hidden processing unit is used or is included by other processing unit, processing is performed similarly as a case in which the processing unit is displayed, as a rule. Each processing unit may be hidden regardless of the state of "editing," "editing-halt" or "editing-complete."

Second Embodiment

Figure 3:
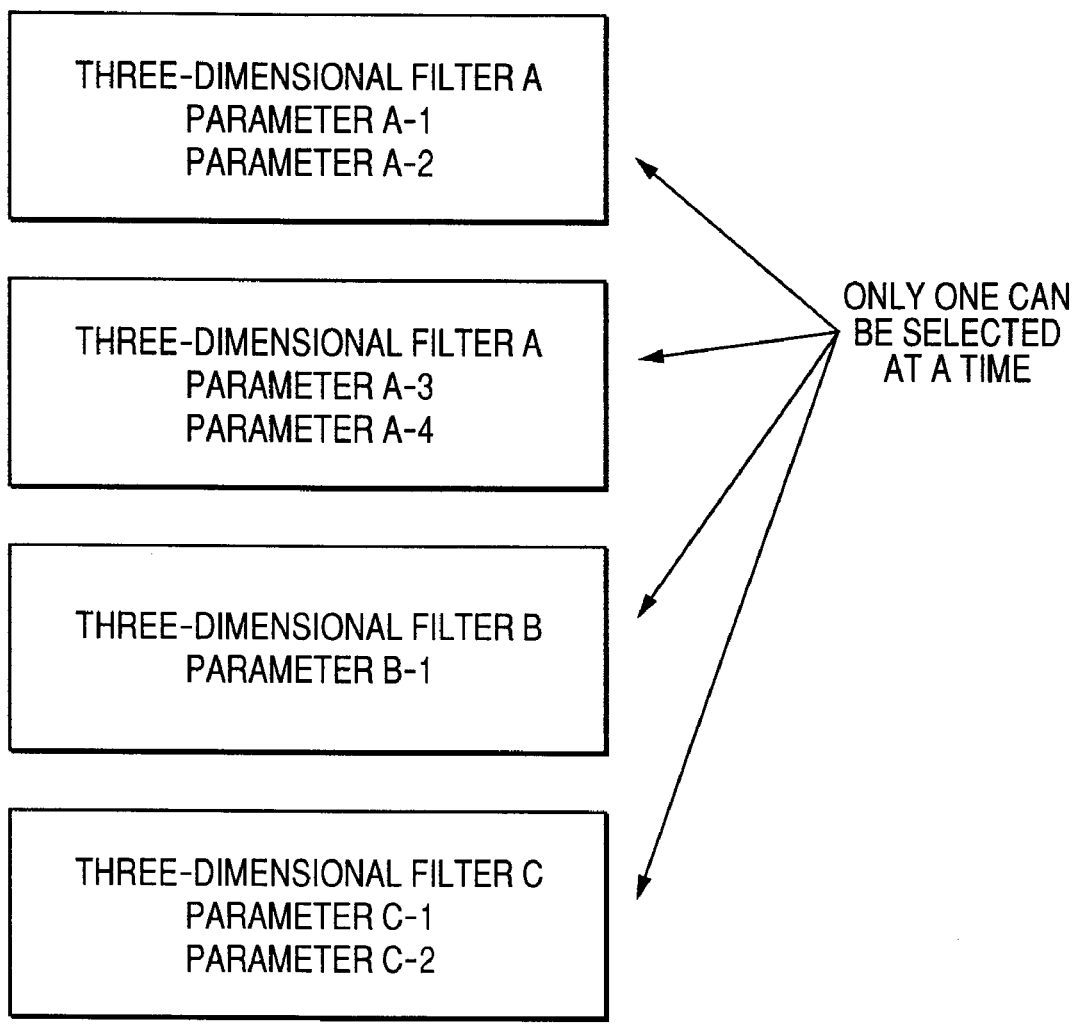
FIG. 3 is a schematic representation in which a plurality of exclusive processing units is generated in a second embodiment of the invention.

FIG. 3 is a schematic representation in which a plurality of exclusive processing units is generated in a second embodiment of the invention. Shown here is a case where a three-dimensional filter A including parameters A-1 and A-2, a three-dimensional filter A including parameters A-3 and A-4, a three-dimensional filter B including a parameter B-1, and a three-dimensional filter C including parameters C-1 and C-2 are generated as the exclusive processing units. When the exclusive processing unit is generated, only one filter can be selected at a time.

In the embodiment, a plurality of exclusive processing units can be generated. For example, a color function and an opacity function in ray casting are usually installed as an LUT (Look-Up Table), and in one image, one color function and one opacity function are assigned. In MIP (Maximum Intensity Projection), image adjustment is performed by using a WW/WL (Window Level) function (three-dimensional filter)
.

For a single image, only one of color function, opacity function or WW/WL function can be set at a time. However, when the user can observe an image while switching among color functions, opacity functions and WW/WL functions, it is effective for diagnosis. Thus, a plurality of processing units is generated and is respectively provided with exclusive attribute so as to be managed. Particularly in this embodiment, a plurality of processing units of which processing types are different such as the color function, the opacity function and the WW/WL function can be managed.

In addition, as the exclusive processing units, replacement of an algorithm in a functional image such as a perfusion image is included. In this case, since required parameters vary from one algorithm to another, the processing type varies. Furthermore, in a case where a type of the 3D filter is replaced, since the parameters required for a different filter algorithm vary, the processing type varies. Incidentally, exclusive processing in a single processing type exists in a related art (for example, preset of a plurality of cameras, etc.,).

It is effective in a case where long time and much labor are taken for calculating each functional image when algorithms of a plurality of functional images are switched for use. For example, after calculation of one functional image is started, the functional image enters the "editing-halt" state, and the parameters necessary for calculation of another functional image can be set.

Third Embodiment

Figure 4:
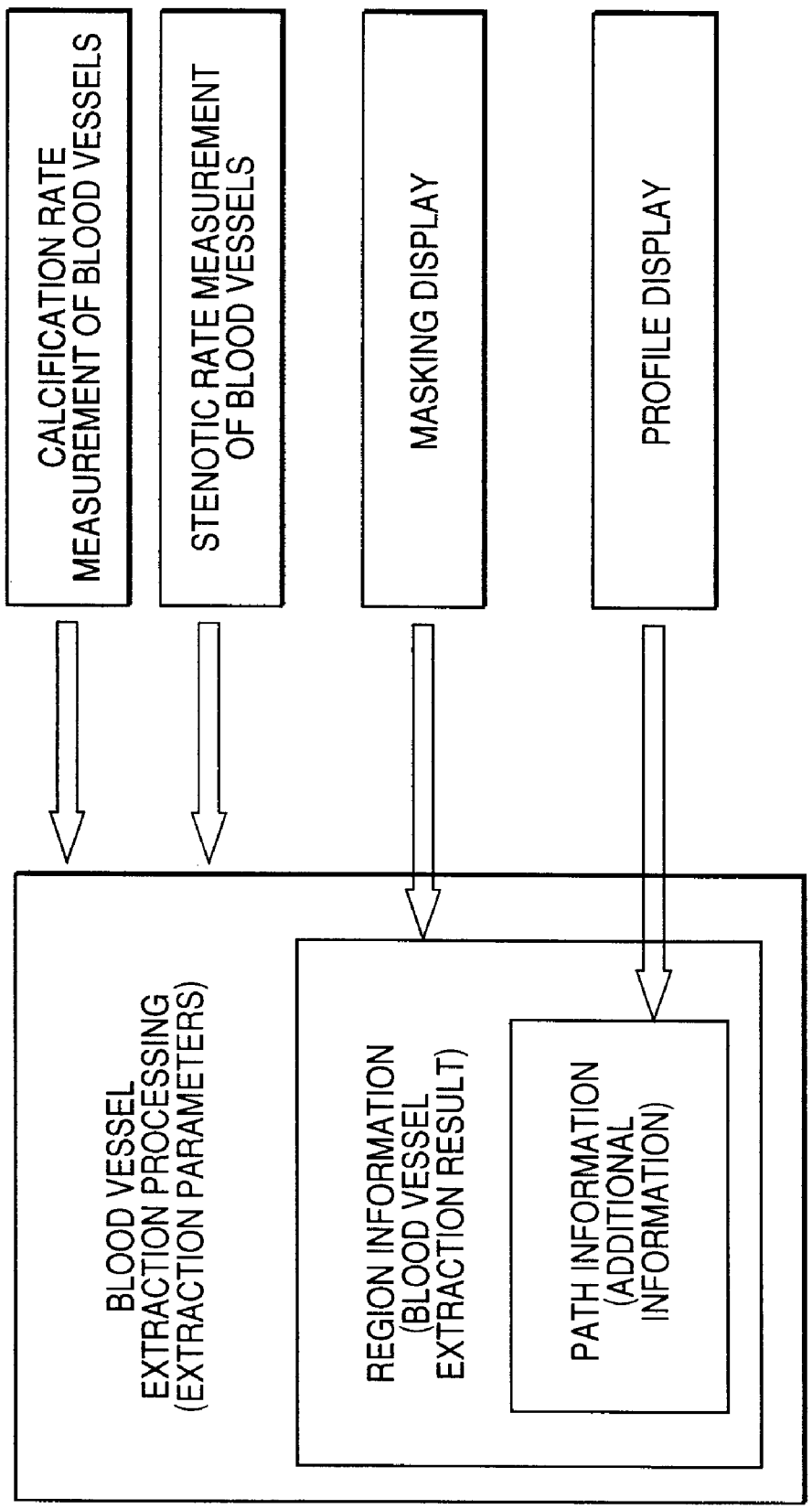
FIG. 4 is a schematic representation in which processing units are put into a hierarchy in a third embodiment of the invention.

FIG. 4 is a schematic representation in which processing units are put into a hierarchy as one processing unit "includes" other processing unit, in a third embodiment of the invention. For example, as shown in the figure, blood vessel extraction processing (extraction parameters) corresponding to the calcification rate measurement of blood vessels and a stenotic rate measurement of blood vessels, region information (blood vessels extraction result) corresponding to masking display, and path information (additional information) corresponding to profile display can be put into a hierarchy. In this case, the processing type is "blood vessel extraction processing," and thus the GUI of "blood vessel extraction processing" is displayed. However, the "included" processing units can be used from other processing units as internal parameters.

In this embodiment, when the processing units have the use relationship, information to be actually used can be selected and determined automatically from the processing units. That is, for example, in a case of the blood vessel extraction processing unit, a blood vessel region and a blood vessel path can be obtained as a calculation result. The blood vessel region and the blood vessel path can be used in a different processing unit.

In this embodiment, the processing unit of the use-destination notifies the use-source of a necessary type information (processing type) of the use-source, whereby the processing unit of the use-source can select only the information required by the use-destination from information in the use-source, and can provide the selected information to the use-destination.

For example, since the calcification rate measurement of blood vessels processing unit requires blood vessel region information, the blood vessel extraction processing unit can provide the blood vessel region information contained in the processing unit to the calcification rate measurement of blood vessels processing unit. Similarly, when the blood vessel region information is in association with the stenotic rate measurement of blood vessels processing unit, effective vessel information can be obtained.

Since CPR (Curved Multi Planar Reconstruction) processing unit requires path information, the blood vessel extraction processing unit provides the blood vessel path information contained in the processing unit to the CPR processing unit. In doing so, the user operates without regard for the processing type of the processing unit being handled, and flexible operation can be performed. Moreover, underlying processing unit can be hidden from user to avoid unaware modification. For example, raw path information is hidden from user, which used in CPR image. While the raw path information is included in blood vessel extraction processing unit and the blood vessel extraction processing unit have full control of the raw path information. Here, the CPR image is an image displaying a cross-sectional curved surface of a volume along the path. User should operate raw path information via blood vessel extraction processing unit, not directly.

When the calcification rate measurement of blood vessels processing unit uses a voxel value measurement processing unit, and when the blood vessel extraction processing unit is in need of using the voxel value measurement processing unit, the blood vessel extraction processing unit uses the calcification rate measurement of blood vessels processing unit, whereby it can further use the voxel value measurement processing unit. In doing so, the step of separately specifying a plurality of processing units to be used can be skipped.

Figure 5:
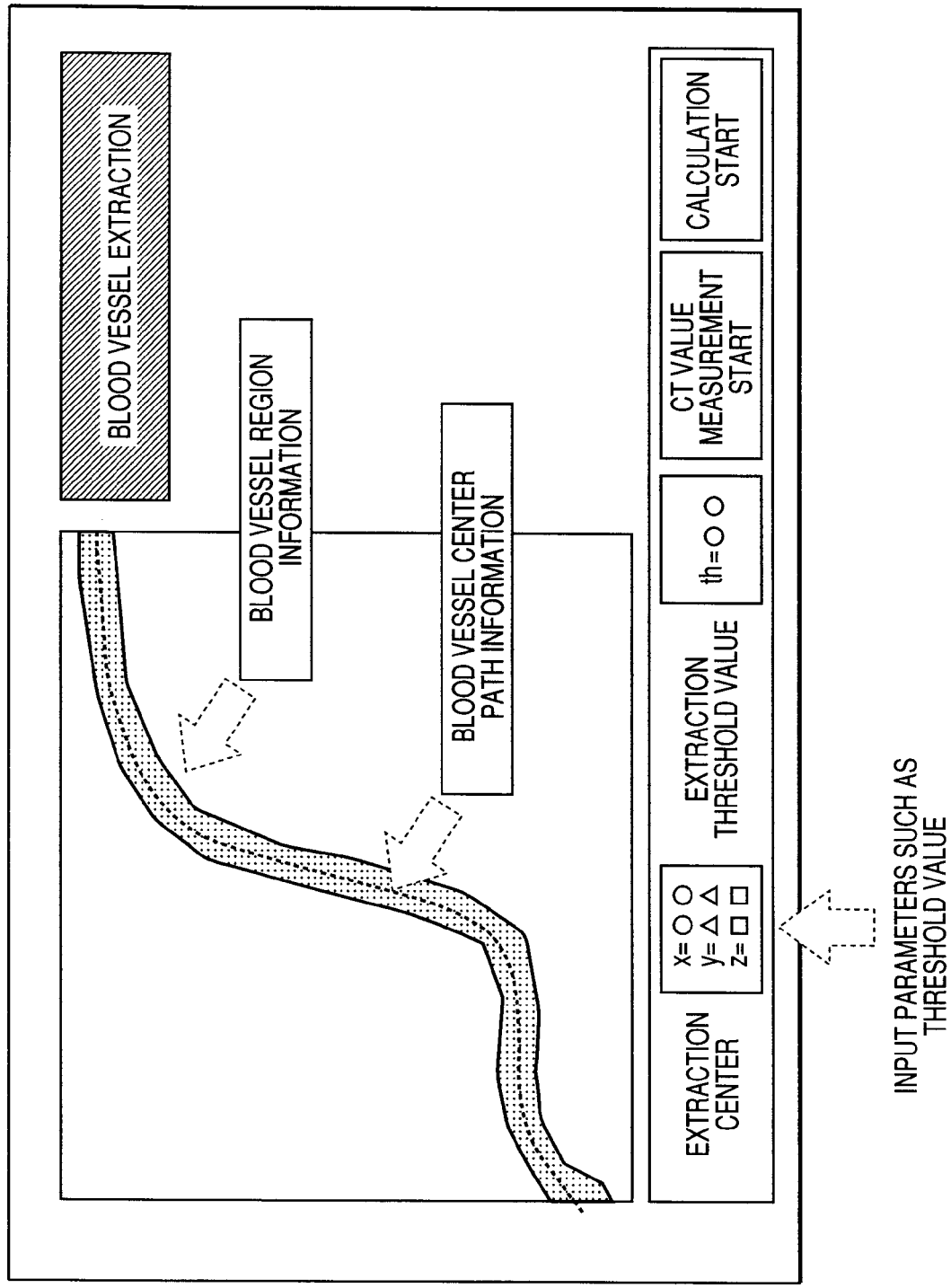
FIG. 5 is detailed schematic representation 1 of a third embodiment.

FIG. 5 is a detailed schematic representation 1 of the third embodiment. When the information contained in the processing result of the blood vessel extraction processing unit are used in various manners, for example, input parameters such as a threshold value are entered in [EXTRACTION CENTER] and [EXTRACTION THRESHOLD VALUE], whereby processing of the blood vessel extraction processing unit is performed, and the result information can be used such as the blood vessel region information and blood vessel center path information as the processing result.

Figure 6:
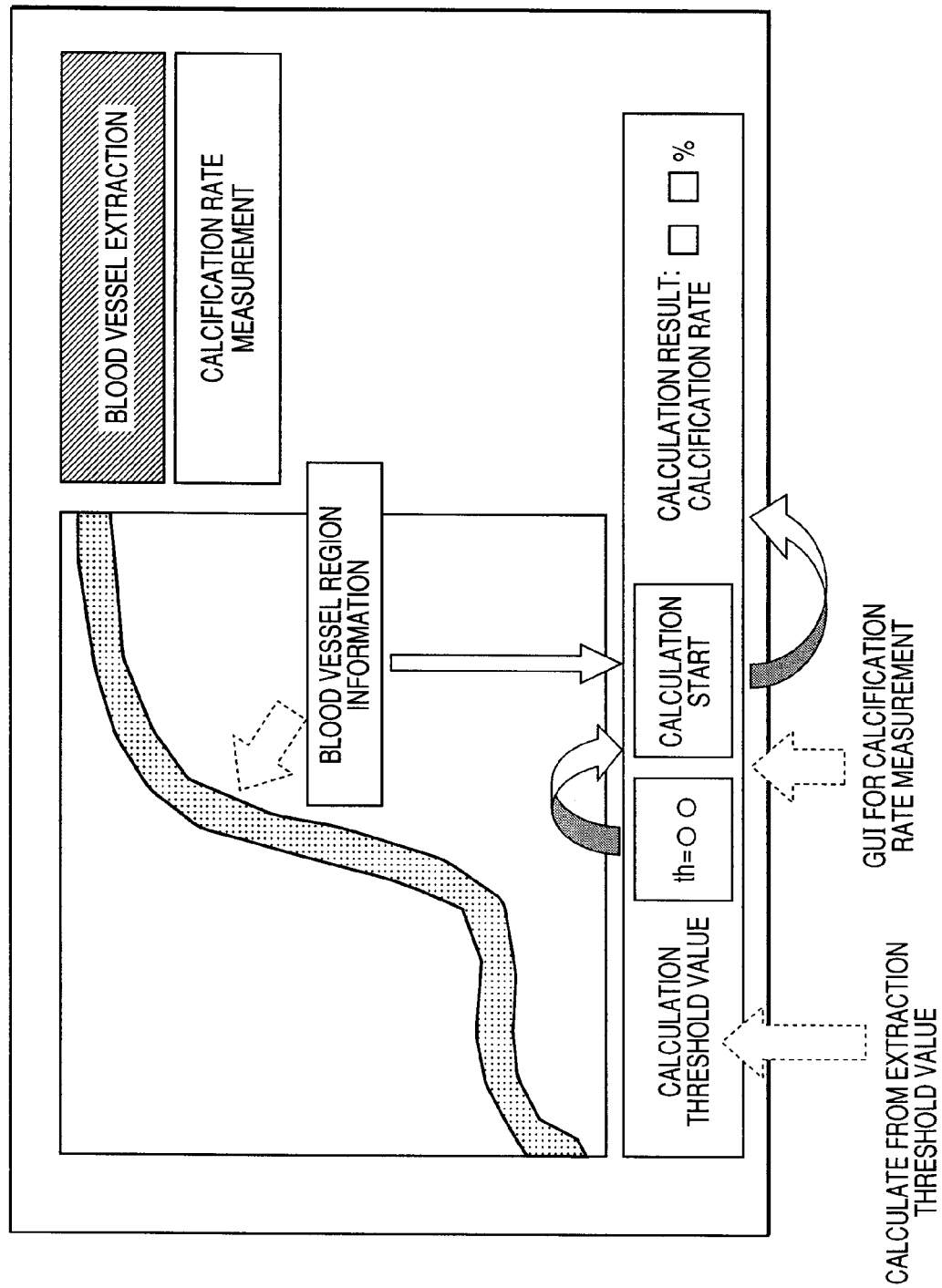
FIG. 6 is detailed schematic representation 2 of a third embodiment.

FIG. 6 is a detailed schematic representation 2 of the third embodiment. In the calcification rate measurement of blood vessels processing unit, necessary parameters are automatically acquired from the processing unit used by the calcification rate measurement of blood vessels processing unit. The calcification rate measurement of blood vessels processing unit quantifies by calculation a degree that a blood vessel hardens as calcium accumulates in the blood vessel. For the calcification rate measurement of blood vessels processing unit to perform processing, specifically, "blood vessel region information" and "calculation threshold value" are required as input parameters. In this case, the calcification rate measurement of blood vessels processing unit is related to the blood vessel extraction processing unit so as to use the blood vessel extraction processing unit. In doing so, the calcification rate measurement of blood vessels processing unit searches the processing result of the blood vessel extraction processing unit for "blood vessel region information" and "extraction threshold value," and associates them with the calcification rate measurement of blood vessels processing unit itself. The value calculated from the "extraction threshold value" is automatically calculated as [calculation threshold value] in GUI for the calcification rate measurement, and the calcification rate is calculated from the "calculation threshold value" and the "blood vessel region information." At this time, when the user enters the "calculation threshold value", the value entered by the user takes precedence over the calculated value and the "extraction threshold value" is excluded from the use relationship.

Figure 7:
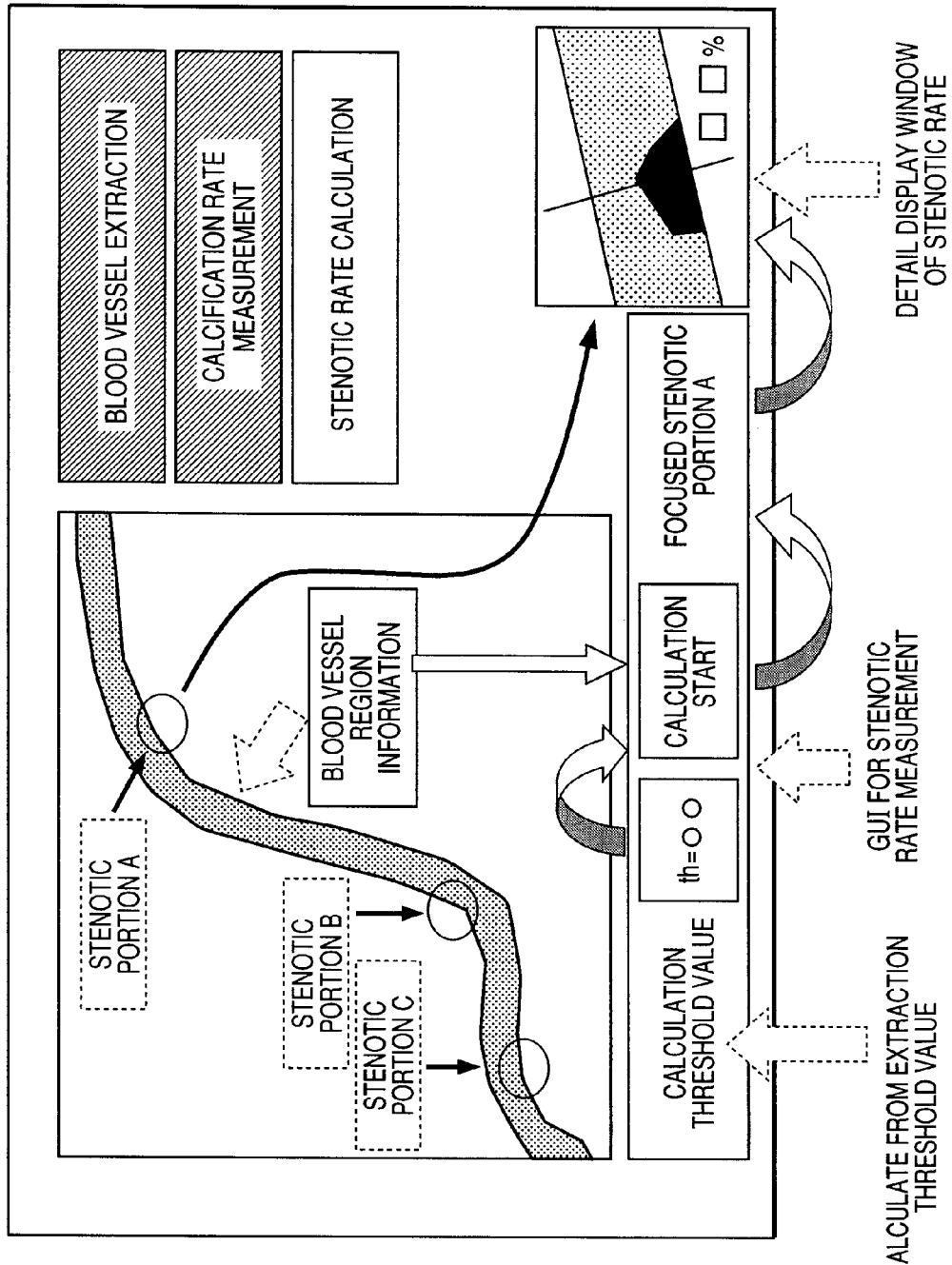
FIG. 7 is detailed schematic representation 3 of a third embodiment.

FIG. 7 is a detailed schematic representation 3 of the third embodiment. In the stenotic rate measurement of blood vessels processing unit, necessary parameters are automatically acquired from the processing unit used by the stenotic rate measurement of blood vessels processing unit. The stenotic rate measurement of blood vessels processing unit quantifies by calculation a degree that blood flow worsens as fat attaches on an inner wall of blood vessels. For the stenotic rate measurement of blood vessels processing unit to perform processing, specifically, "blood vessel region information" and "calculation threshold value" are required as input parameters. In this case, the stenotic rate measurement of blood vessels processing unit is related to the blood vessel extraction processing unit so as to use the blood vessel extraction processing unit. In doing so, the stenotic rate measurement of blood vessels processing unit searches the processing result of the blood vessel extraction processing unit for the "blood vessel region information" and the "extraction threshold value," and associates them with the stenotic rate measurement of blood vessels processing unit itself. The value calculated from the "extraction threshold value" is automatically calculated as [calculation threshold value] in GUI for stenotic rate measurement, and the stenotic rate is calculated from the "calculation threshold value" and the "blood vessel region information." At this time, when the user enters the "calculation threshold value", the value entered by the user takes precedence over the calculated value and the "extraction threshold value" is excluded from the use relationship.

Figure 8:
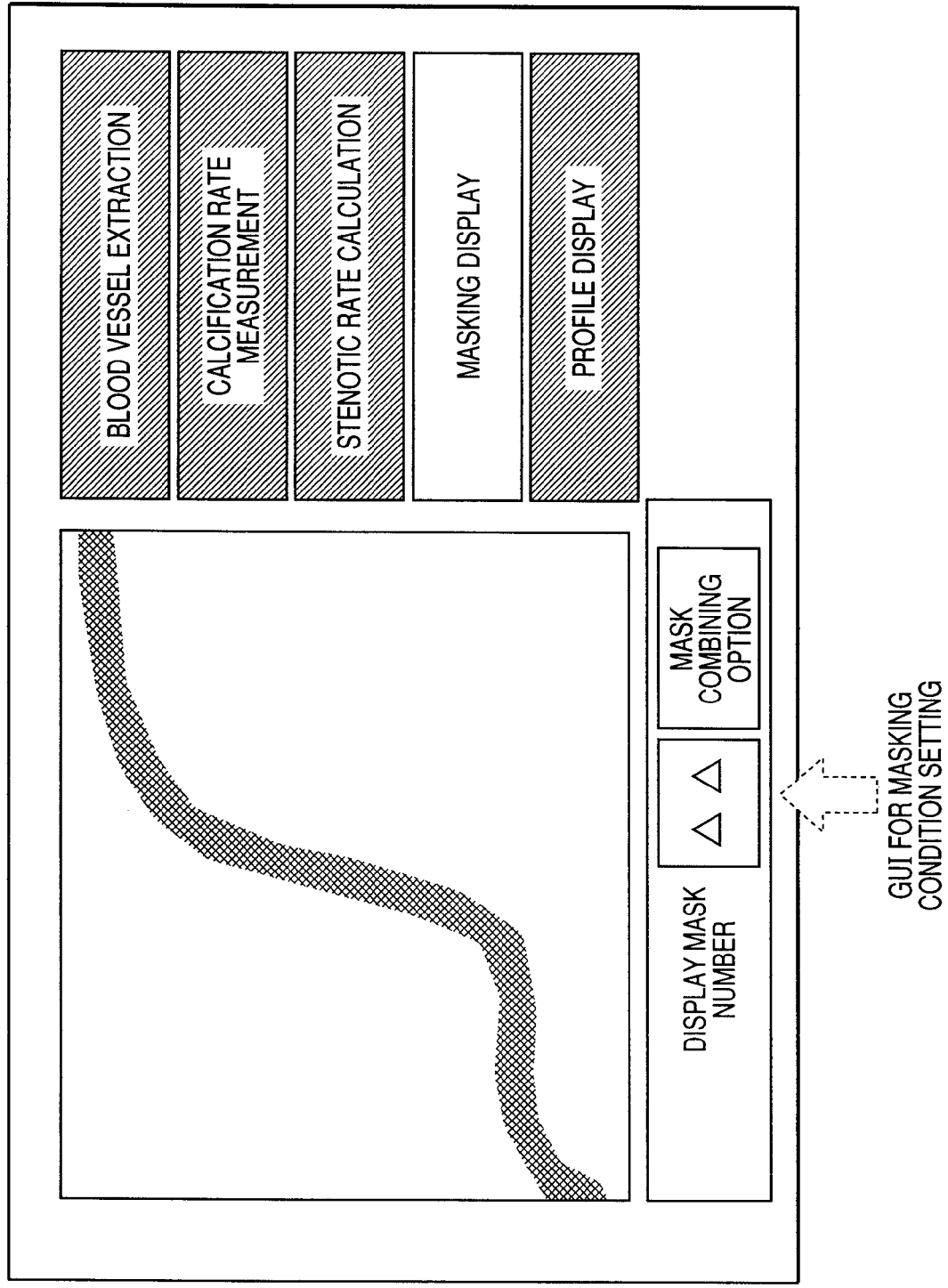
FIG. 8 is detailed schematic representation 4 of a third embodiment.

FIG. 8 is a detailed schematic representation 4 of the third embodiment. In the image masking display processing unit, necessary parameters are automatically acquired from the processing unit used by the masking display processing unit. The masking display processing unit displays only the region contained in the mask, and supports image diagnosis by undisplaying (hiding) portions to be obstacle of the diagnosis such as peripheral organs. For the masking display processing unit to perform processing, specifically, "blood vessel region information" is required as input parameters. In this case, the masking display processing unit is related to the blood vessel extraction processing unit so as to use the blood vessel extraction processing unit. In doing so, the masking display processing unit searches the processing result of the blood vessel extraction processing unit for the "blood vessel region information," and further associates "region information" of the "blood vessel region information" with the masking display processing unit itself. A display mask number is displayed on GUI for the masking condition setting.

Figure 9:
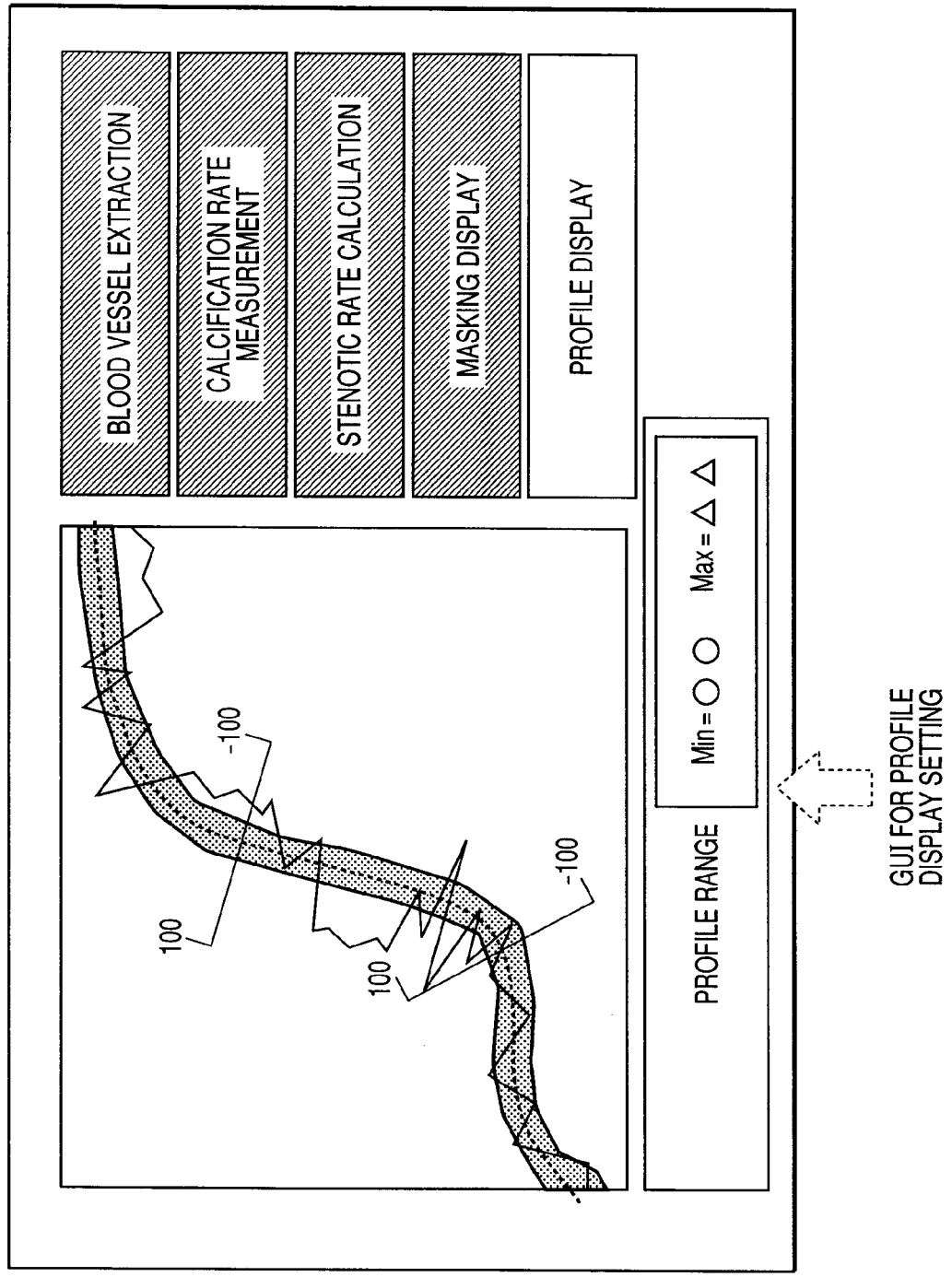
FIG. 9 is detailed schematic representation 5 of a third embodiment.

FIG. 9 is a detailed schematic representation 5 of the third embodiment. In the profile display processing unit, necessary parameters are automatically acquired from the processing unit used by the profile display processing unit. The profile display processing unit displays a transition of voxel values on the path as a graph, thereby objectively displaying a state of a tissue on the path. In FIG. 9, a change of CT values on the path of the blood vessels is shown. For the profile display processing unit to perform processing, specifically, "path information" is required as input parameters. In this case, the profile display processing unit is related to the blood vessel extraction processing unit so as to use the blood vessel extraction processing unit. In doing so, the profile display processing unit searches the processing result of the blood vessel extraction processing unit for "blood vessel path information," and further associates "path information" of the "blood vessel path information" with the profile display processing unit itself. A profile range is displayed on GUI for the profile display setting.

The processing units in the editing states can be switched mutually as shown in FIGS. 8 and 9. The processing unit exiting the editing state enters the editing-halt state or the editing-complete state. Accordingly, flexible operation is made possible. Each processing unit can be undisplayed (hidden) as desired. Particularly, the processing unit in the editing-halt state or the editing-complete state is hidden, whereby hindrance to edit other processing unit can be prevented. Further, for example, when the processing unit enters the editing-halt state or the editing-complete state in the processing type for performing complicated display such as the stenotic rate measurement, it is convenient if the processing unit automatically enters the hidden state.

Fourth Embodiment

Figure 10A:
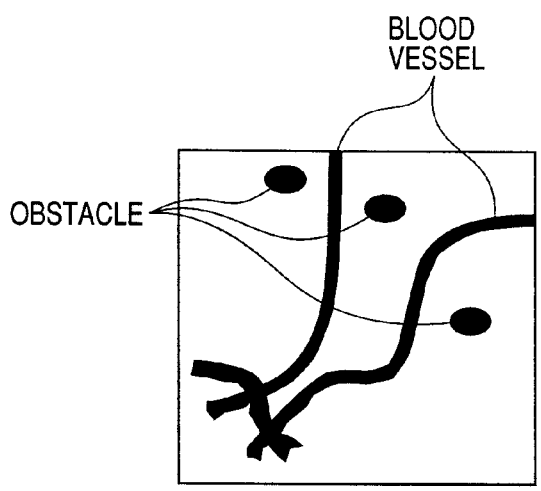
FIG. 10 is a schematic representation showing a case where a processing order of processing units is managed in a fourth embodiment of the invention.
Figure 10B:
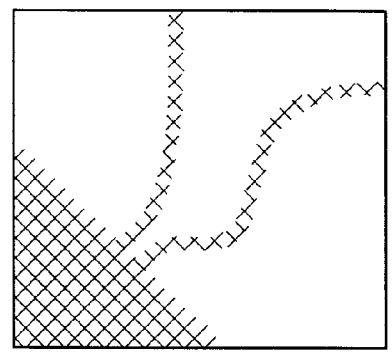
Figure 10C:
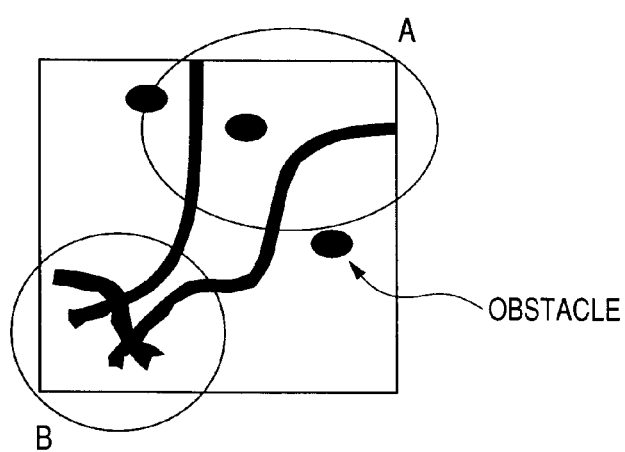
Figure 11A:
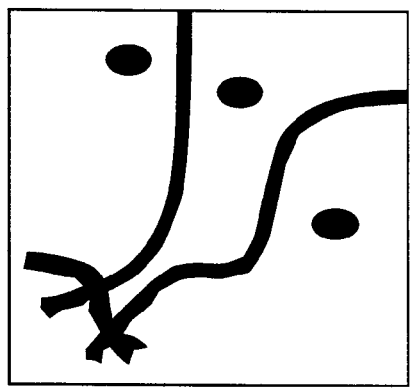
FIG. 11 is a schematic representation showing a desirable operation procedure in a fourth embodiment.
Figure 11B:
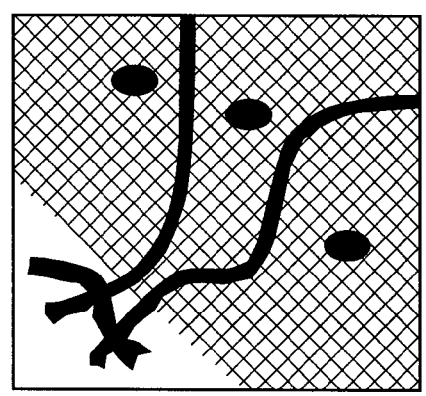
Figure 11C:
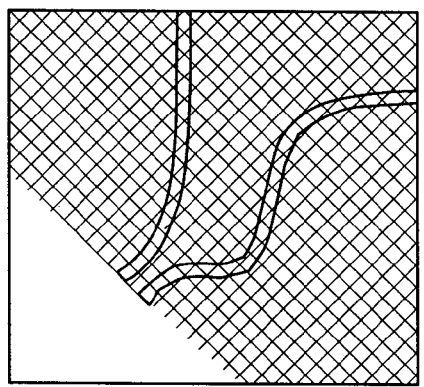
Figure 11D:
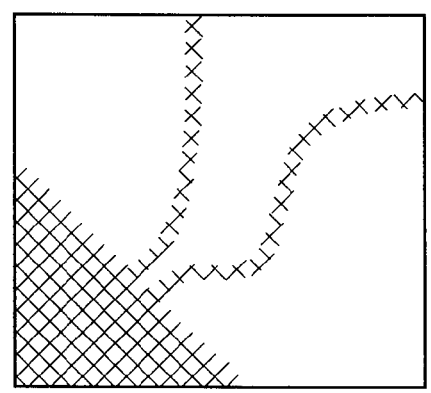

FIG. 10 shows a case where the processing order of processing units is managed in a fourth embodiment of the invention. A user may want to obtain a region as shown in FIG. 10B when data as shown in FIG. 10A exists. That is, only portion of A as shown in FIG. 10C can be processed successfully by automatic region extraction, but observation obstacles exist only in the portion of A and the region extraction processing should preferably be limited to a partial range. Incidentally, the automatic region extraction cannot well be applied to portion of B in FIG. 10C, but here the automatic region extraction need not be executed.

FIG. 11 shows a desirable operation procedure in the fourth embodiment. Operation is started on the data shown in FIG. 11A. Next, only a part to which calculation of the region extraction is applied is used for selection (plane cut masking processing unit), as shown in FIG. 11B. After the selection, the editing-halt state is set. Next, region extraction processing (blood vessel extraction processing unit) is performed, as shown in FIG. 11C. The blood vessel extraction processing unit uses the plane cut masking processing unit. This is a use of a processing unit in the editing-halt state. Next, mask region in the plane cut masking processing unit is inverted, as shown in FIG. 11D. In this case, recalculation of the blood vessel extraction processing unit is not performed, and the processing result is not changed, because "use management" is conducted.

Thus, in this embodiment, the use management of a plurality of processing units is conducted. When the processing units have the use relationship, when change is added to the processing unit of the use-source, the change affects the processing unit of the use-destination as a rule. However, in some cases, it is appropriate that the change in the use-source does not affect the use-destination. Whether or not the change in the use-source affects the use-destination is determined based on the relationship between the processing units.

In order to realize the "use management," a method of using a manager or a method of self-reliant management as the processing units communicate with each other can be used. Further, when the processing unit of the use-source is deleted, whether or not the effect affects the processing unit of the use-destination is also determined.

For example, the region extraction processing unit, etc., has an effect on the masking processing unit. When a plurality of processing units exists, generated region is an AND-region of the result regions of the processing units, for example. At this time, when one region extraction processing unit is deleted, whether or not the result affects the masking processing unit is arbitrary.

FIG. 12 is a detailed schematic representation 1 of the fourth embodiment. In an initial state, the blood vessel to be extracted, obstacles of display, and a region where the extraction processing does not much well operate exist.

Figure 13:
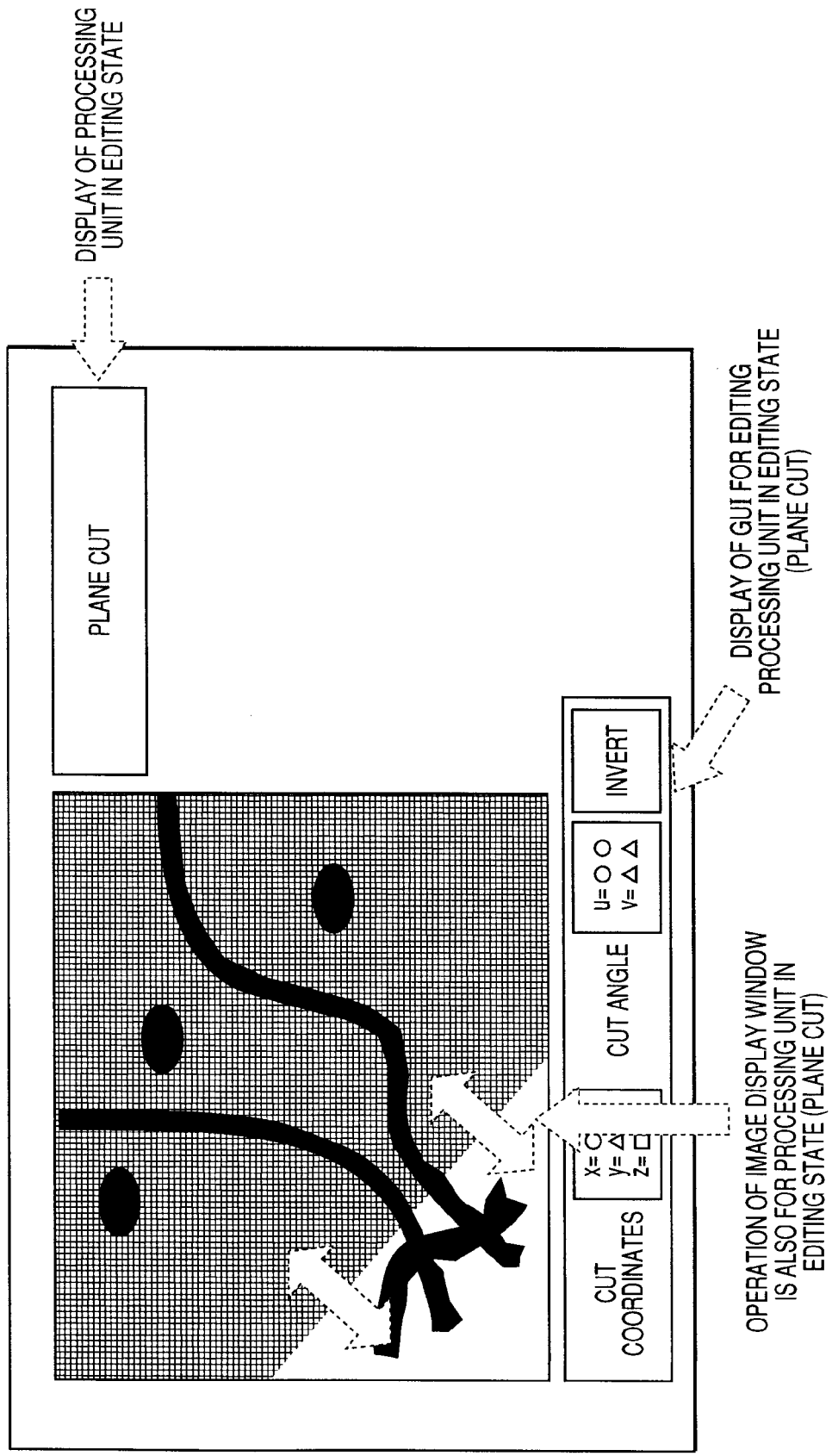
FIG. 13 is detailed schematic representation 2 of a fourth embodiment.

FIG. 13 is a detailed schematic representation 2 of the fourth embodiment. FIG. 13 shows a case where the plane cut masking processing unit is started so as to limit a range on which the blood vessel region extraction processing is to be performed. [PLANE CUT] icon displays the processing unit in the editing state. A user's operation on an image display window is interpreted as a command to the processing unit to enter the editing state (plane cut). A GUI for editing the processing unit in the editing state (plane cut) is displayed.

Figure 14:
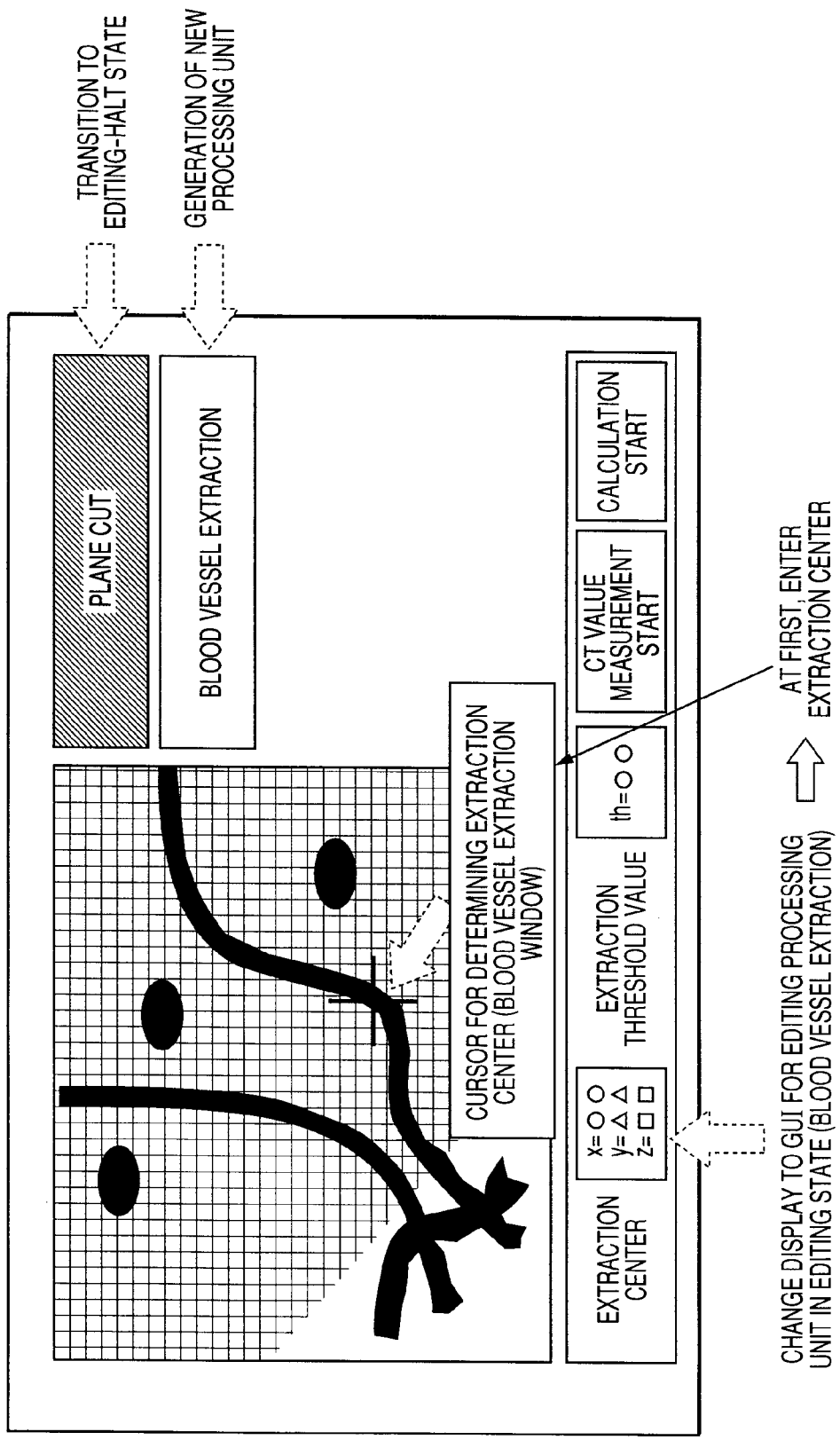
FIG. 14 is detailed schematic representation 3 of a fourth embodiment.

FIG. 14 is a detailed schematic representation 3 of the fourth embodiment. FIG. 14 shows a start of the blood vessel region extraction processing unit. Here, a transition is made to the editing-halt state (plane cut), and a new processing unit (blood vessel extraction) is generated. Since the "blood vessel extraction" uses the result of the "plane cut," the use relationship therebetween is automatically constructed. The "plane cut" is in the editing-halt state, but already input parameters and the output result can be used by the "blood vessel extraction." The display is changed to a GUI for editing the processing unit in the editing state (blood vessel extraction). Next, the user enters an extraction center with a cursor for determining the extraction center (blood vessel extraction window).

Figure 15:
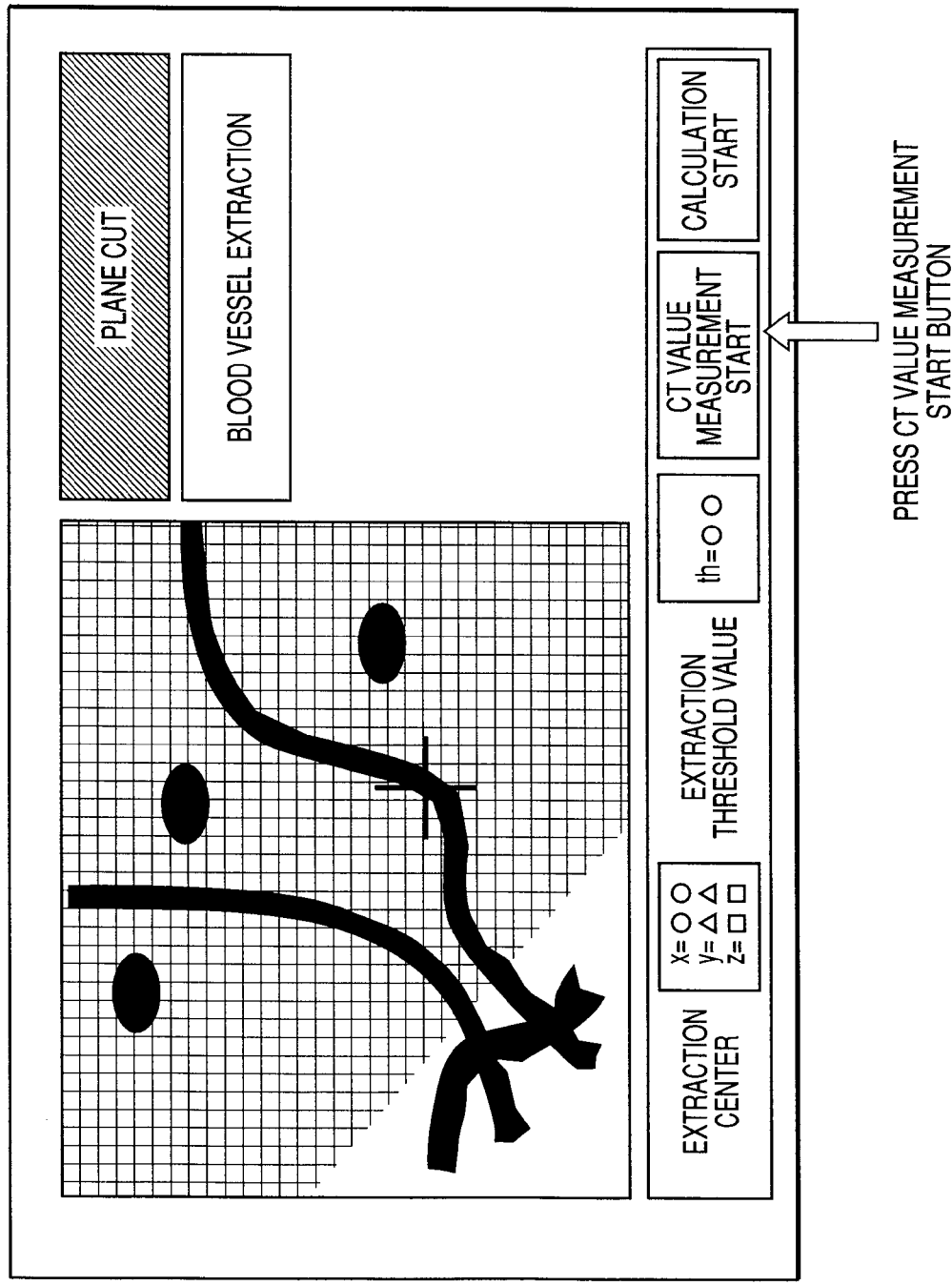
FIG. 15 is detailed schematic representation 4 of a fourth embodiment.

FIG. 15 is a detailed schematic representation 4 of the fourth embodiment. FIG. 15 shows a case where CT value measurement is to be performed because the extraction threshold value required for the blood vessel region extraction processing unit becomes necessary. In order to perform the CT value measurement, the user presses a CT value measurement start button.

Figure 16:
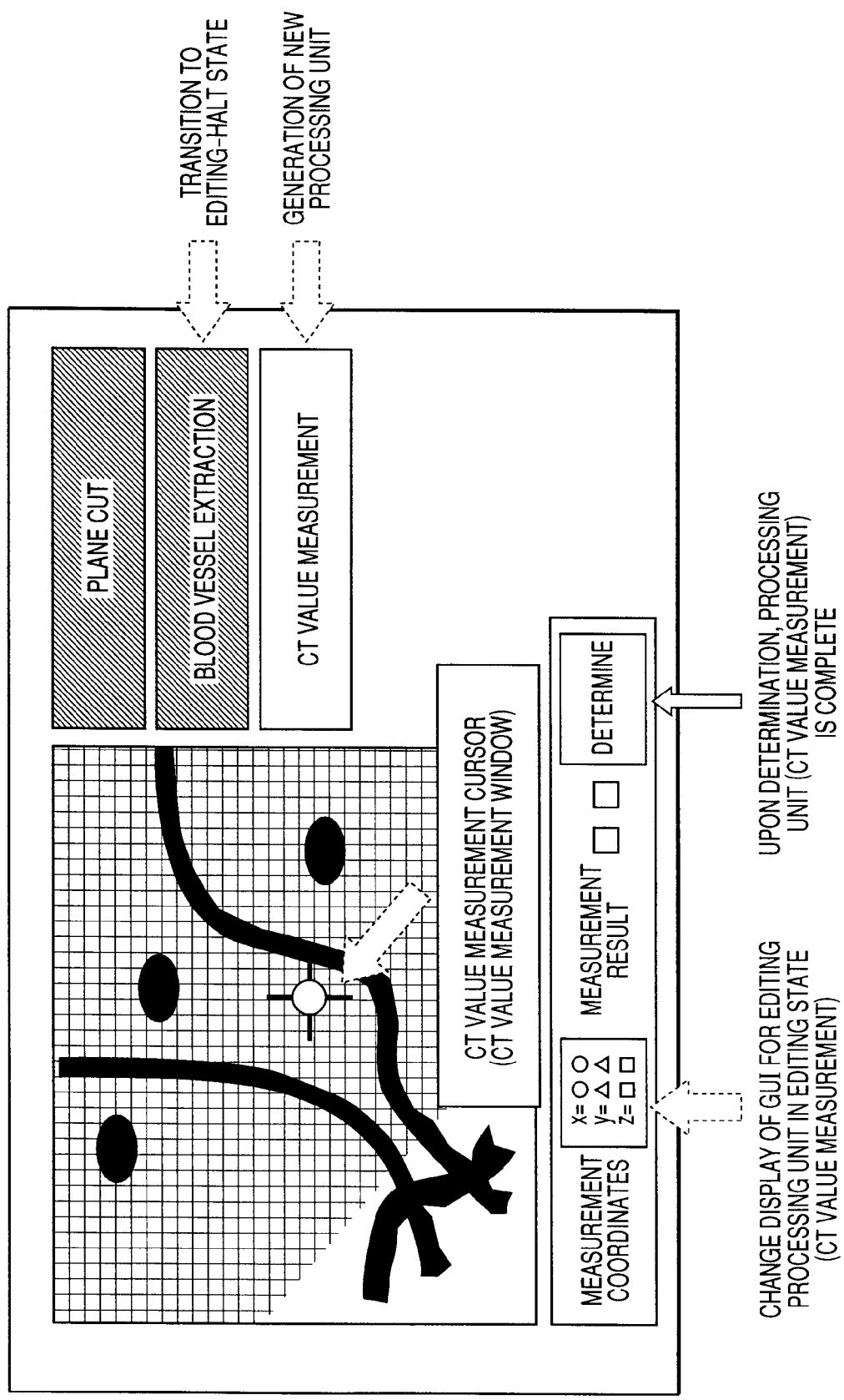
FIG. 16 is detailed schematic representation 5 of a fourth embodiment.

FIG. 16 is a detailed schematic representation 5 of the fourth embodiment. Here, CT value measurement is started. A transition is made to the editing-halt state (blood vessel extraction), and a new processing unit (CT value measurement) is generated. Since the "blood vessel extraction" uses the result of the "CT value measurement," the use relationship therebetween is automatically constructed. The display is changed to a GUI for editing the processing unit in the editing state (CT value measurement), and a CT value measurement cursor (CT value measurement window) is displayed. When the user determines the CT value by using the CT value measurement cursor, the processing unit (CT value measurement) is complete.

Figure 17:
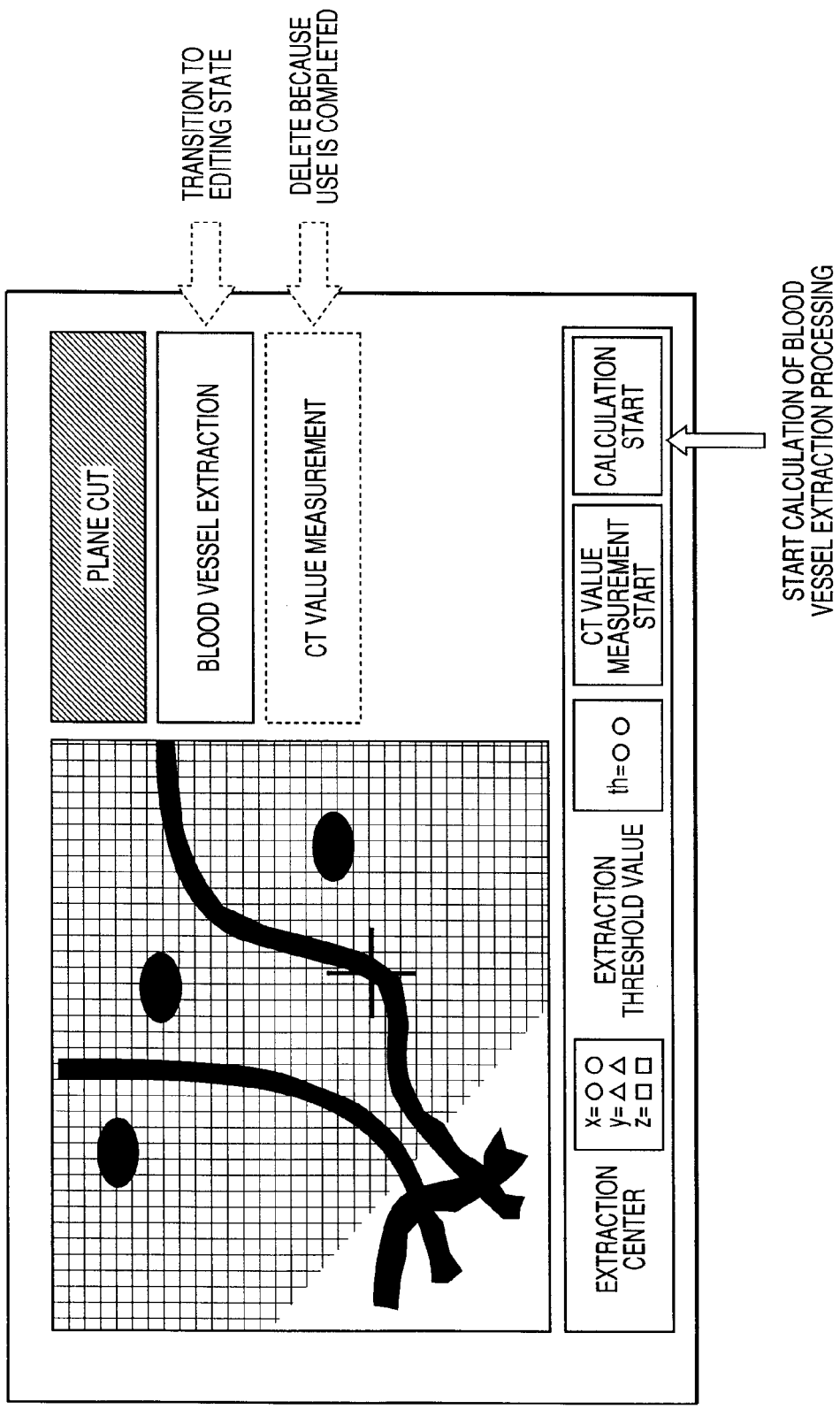
FIG. 17 is detailed schematic representation 6 of a fourth embodiment.

FIG. 17 is a detailed schematic representation 6 of the fourth embodiment. When the parameters required for blood vessel extraction are obtained, a transition is made from the editing-halt state (blood vessel extraction) to the editing state (blood vessel extraction). The [CT VALUE MEASUREMENT] processing unit may be deleted because the use of the processing unit is completed. Although the "blood vessel extraction" uses the "CT value measurement," when the "CT value measurement" is deleted, the parameter values already set are maintained by the "use management." Next, calculation of the blood vessel extraction processing is started.

Figure 18:
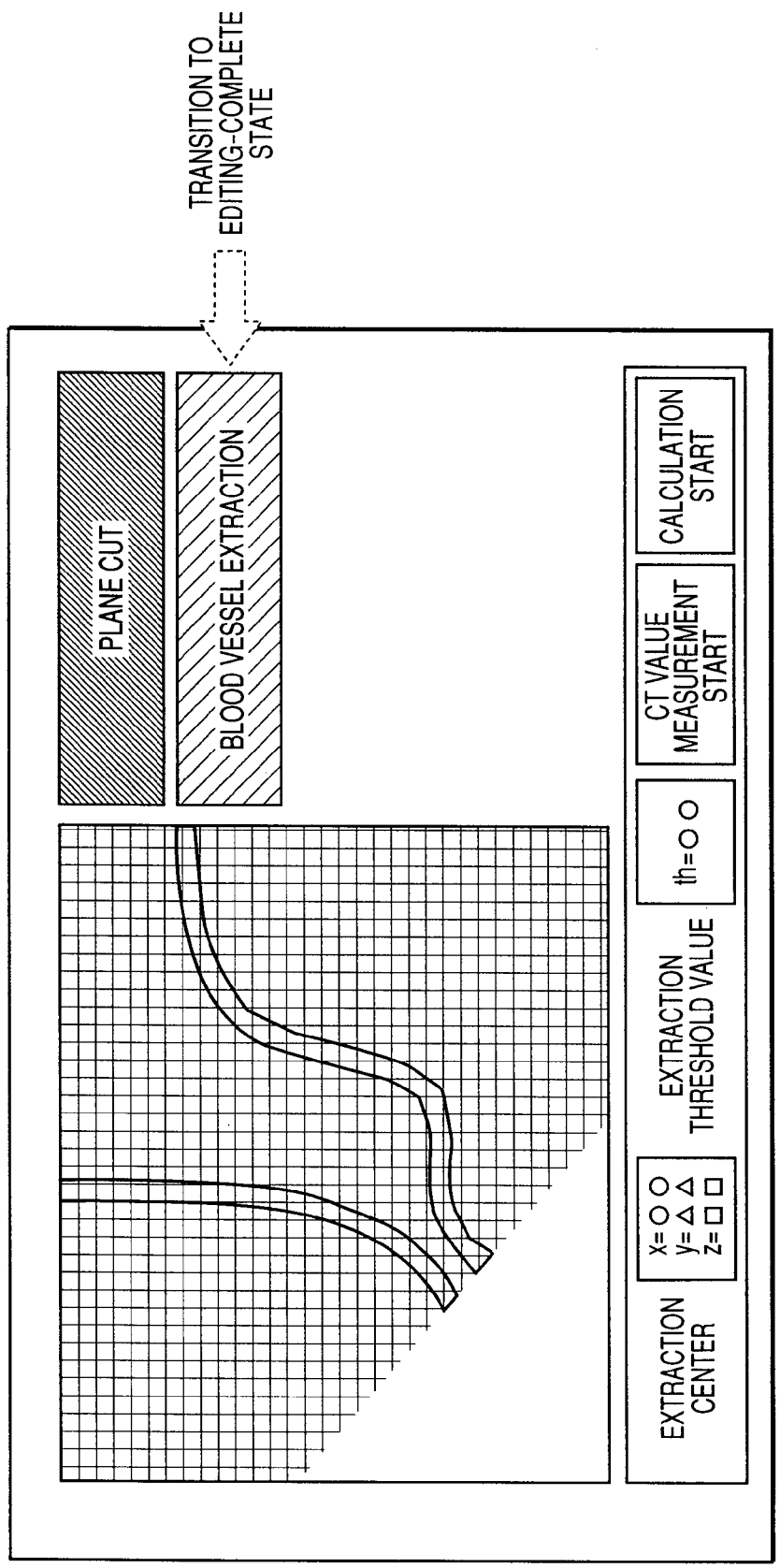
FIG. 18 is detailed schematic representation 7 of a fourth embodiment.
Figure 19:
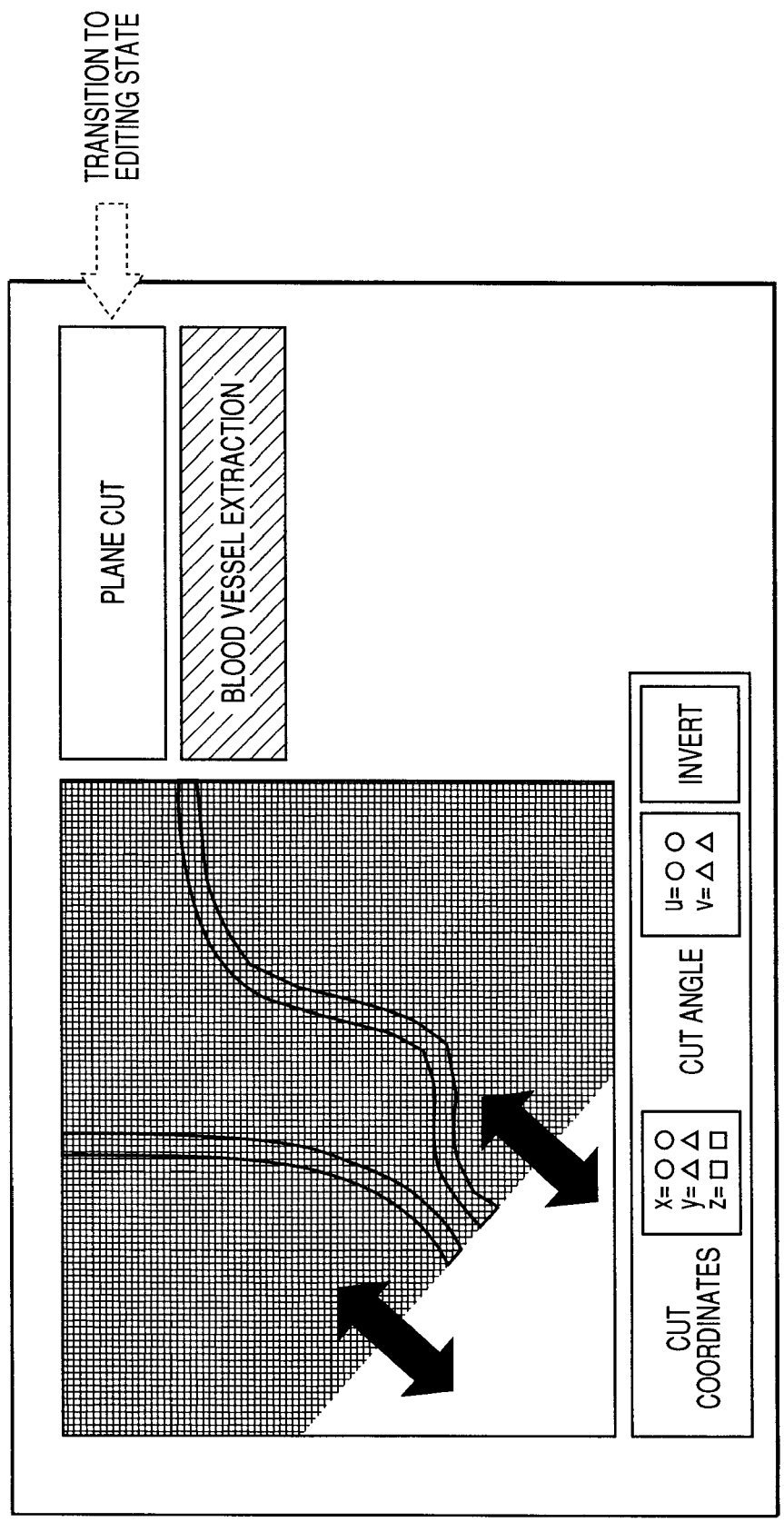
FIG. 19 is detailed schematic representation 8 of a fourth embodiment.

FIG. 18 is a detailed schematic representation 7 of the fourth embodiment. Upon completion of the blood vessel extraction, a transition is made to the editing-complete state (blood vessel extraction). FIG. 19 is a detailed schematic representation 8 of the fourth embodiment. In order to acquire the remaining region, a transition is made to the editing state (plane cut).

Figure 20:
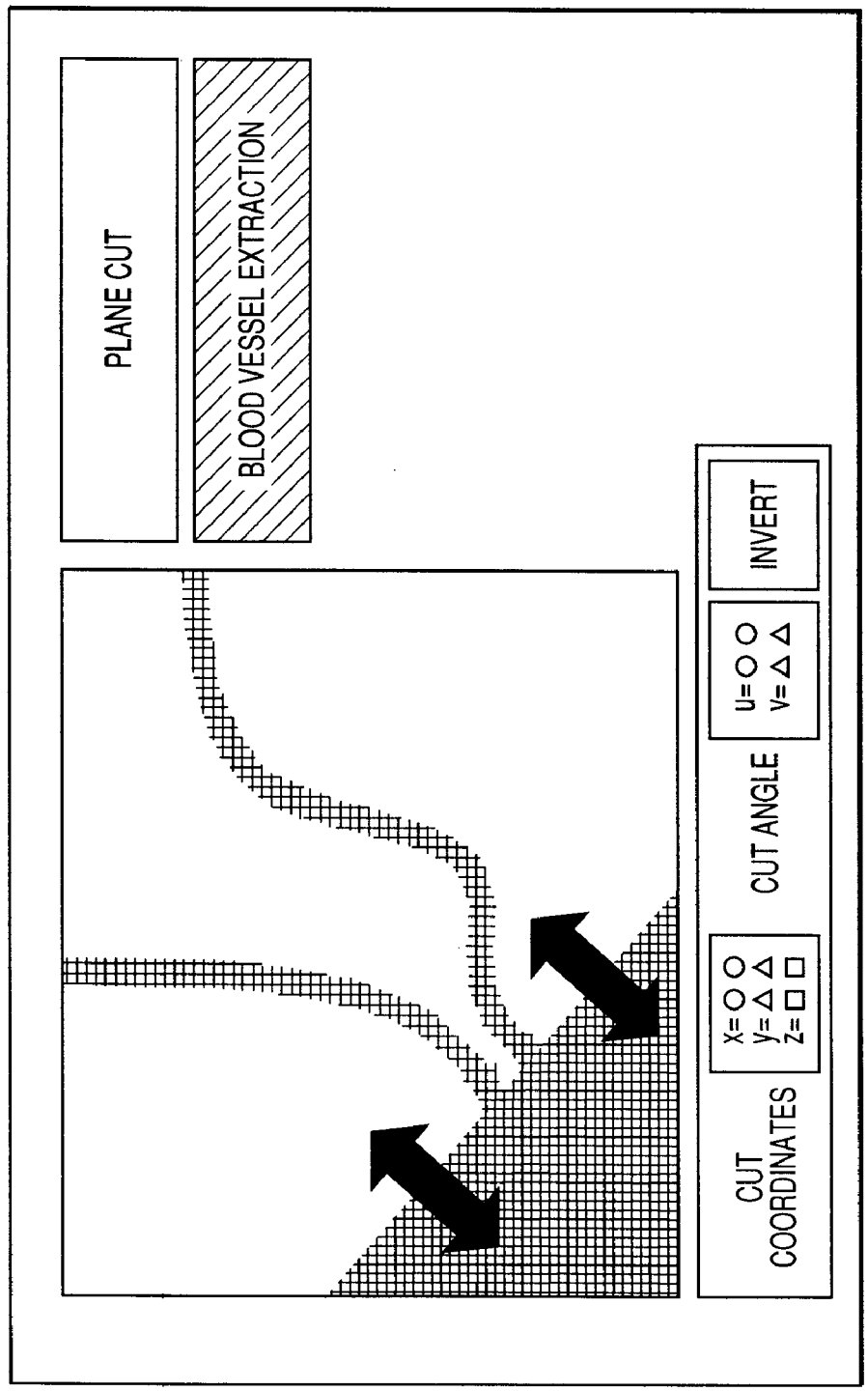
FIG. 20 is detailed schematic representation 9 of a fourth embodiment.

FIG. 20 is a detailed schematic representation 9 of the fourth embodiment. Here, the plane cut result is inverted. Although the "blood vessel extraction" uses the "plane cut," the "use management" determines that recalculation of the "blood vessel extraction" is not performed based on the state of the "blood vessel extraction" and the relationship between the "plane cut" and the "blood vessel extraction." Then, acquisition of the region required by the user is now complete.

FIG. 21 is a detailed schematic representation 10 of the fourth embodiment. A mask for image display is set, and a transition is made to the editing-complete state. The "masking" uses the "plane cut" and the "blood vessel extraction." The "use management" determines that even when the "plane cut" and the "blood vessel extraction" are deleted, it does not affect the "masking." When there is a possibility of re-editing, the "plane cut" and the "blood vessel extraction" are held in the editing-complete state. Only the region set by setting the mask can be displayed as volume rendering display.

Figure 22A:
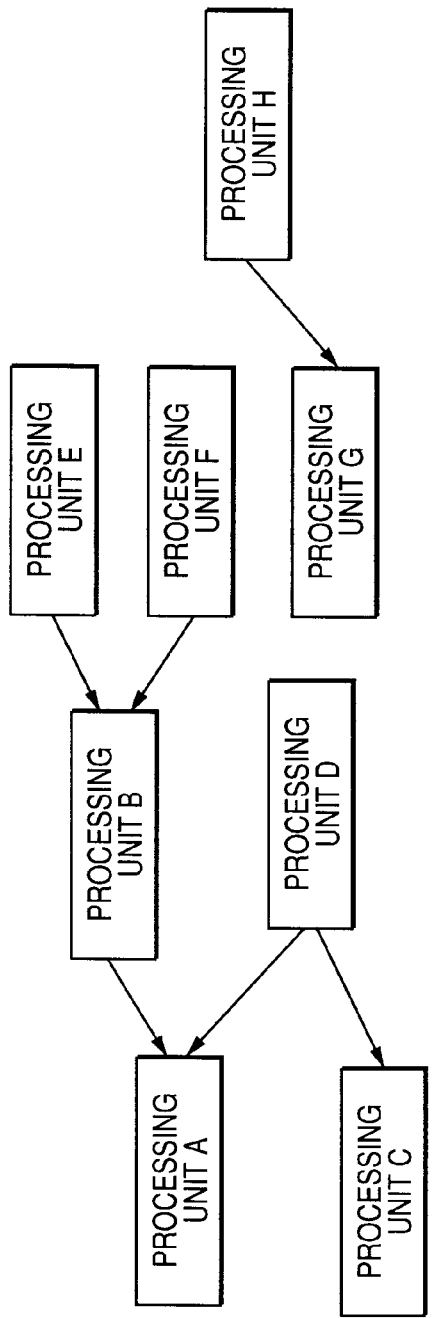
FIG. 22 is a schematic representation showing a data structure in a fourth embodiment.
Figure 22B:
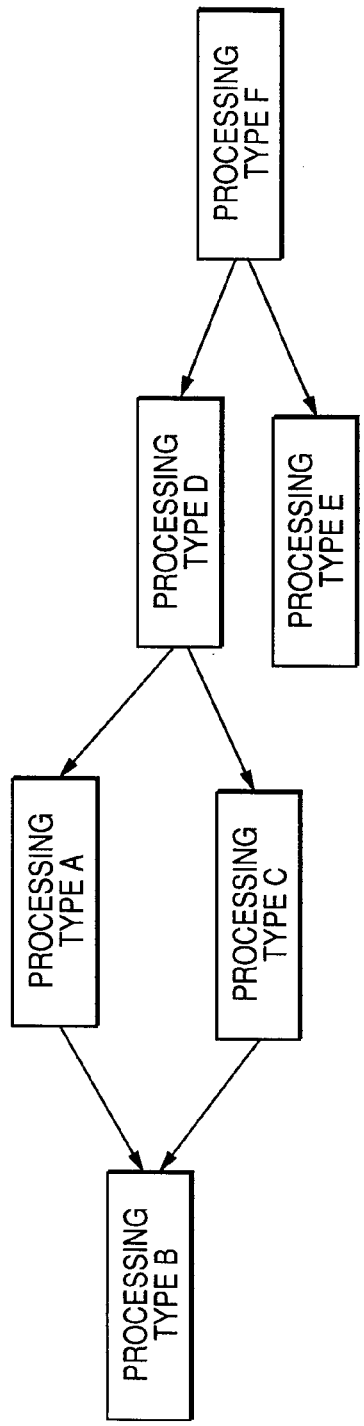

FIGS. 22A and 22B show data structures in this embodiment. As shown in FIG. 22A, the use relationship among the processing units forms a directed non-recursive graph, because the use relationship becomes complicated when the recursive relationship occurs. As shown in FIG. 22B, the inclusion relationship among the processing types also forms a directed non-recursive graph, because the inclusion relationship becomes complicated when the recursive relationship occurs. However, a complicated configuration may result from a combination of the use relationship and the inclusion relationship, without a problem.

Figure 23:
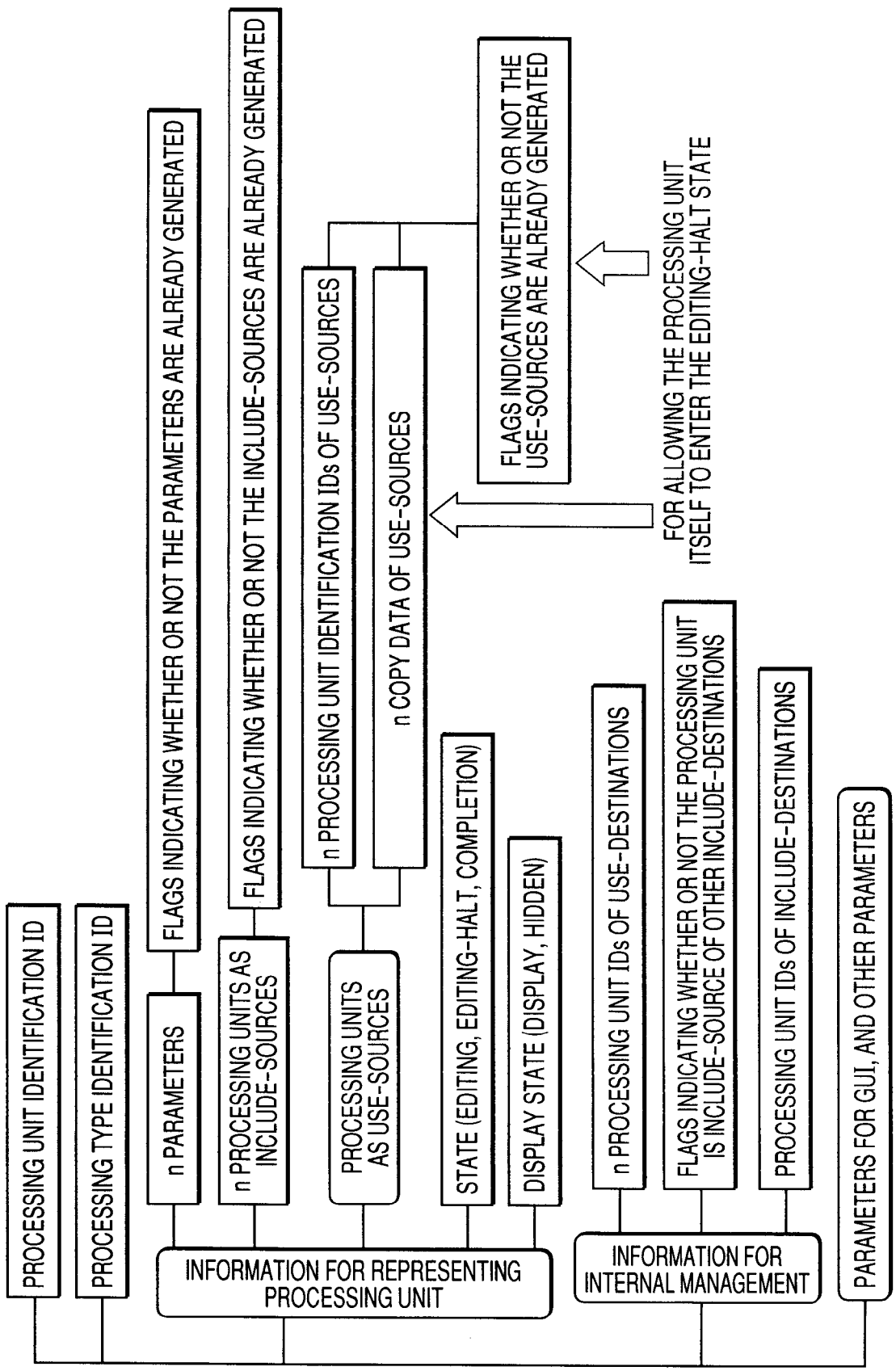
FIG. 23 is a schematic representation showing information contained in a processing unit in a fourth embodiment.

FIG. 23 shows information contained in the processing unit in the embodiment. The information contained in the processing unit includes: a processing unit identification ID; a processing type identification ID; information for representing the processing unit; information for internal management; parameters for GUI; and other parameters. The information for representing the processing unit includes: n parameters; flags indicating whether or not the parameters are already generated; n processing units as include-sources (assuming this processing unit is a include-destination); flags indicating whether or not the include-sources are already generated; to express the use-sources (assuming this processing unit is the use-destination), n processing unit identification IDs of the use-sources, n copy data of the use-sources so as to allow the processing unit itself to enter the editing-halt state, and flags indicating whether or not the use-sources are already generated so as to allow the processing unit itself to enter the editing-halt state; the state (editing, editing-halt, editing-complete); and the display state (display, hidden). The information for internal management includes: n processing unit IDs of the use-destinations (assuming this processing unit is the use-source); flags indicating whether or not this processing unit is the include-source of other include-destinations; and the processing unit IDs of the include-destinations.

Figure 24:
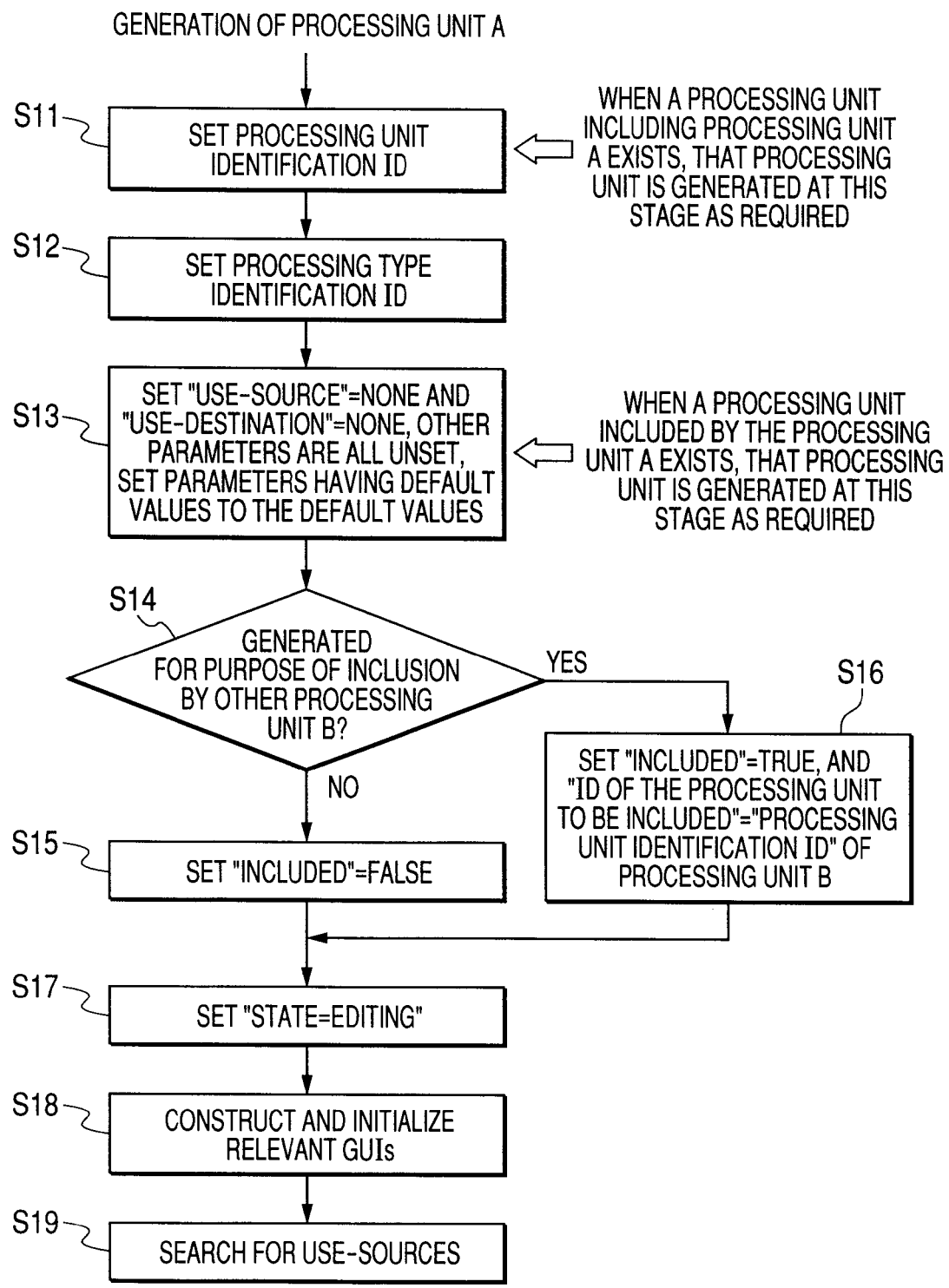
FIG. 24 is a flowchart showing processing when a new processing unit is generated.

FIG. 24 is a flowchart showing processing when a new processing unit is generated. In order to generate a processing unit A, the processing unit identification ID is set (step S11). When a processing unit (include-destination) including the processing unit A (include-source) exists, that processing unit (include-destination) is generated at this stage as required. Next, the processing type identification ID is set (step S12).

Next, "use-source"=none and "use-destination"=none are set. Other parameters are all unset. Parameters having default values are set to the default values (step S13). When the processing unit A (include-destination) includes a processing unit (include-source), that processing unit (include-source) is generated at this stage as required.

Next, whether or not the processing unit A (include-source) is generated for the purpose of inclusion by other processing unit B (include-destination) is determined (step S14). If the determination result is NO, "included"=false is set (step S15); if the determination result is YES, "included"=true, and the "ID of the processing unit to be included (include-destination)"="processing unit identification ID" of processing unit B (include-destination) are set (step S16).

Next, "state=editing" is set (step S17), and relevant GUIs are constructed and are initialized (step S18). A search is made for the using processing units (use-sources) (step S19).

Figure 25:
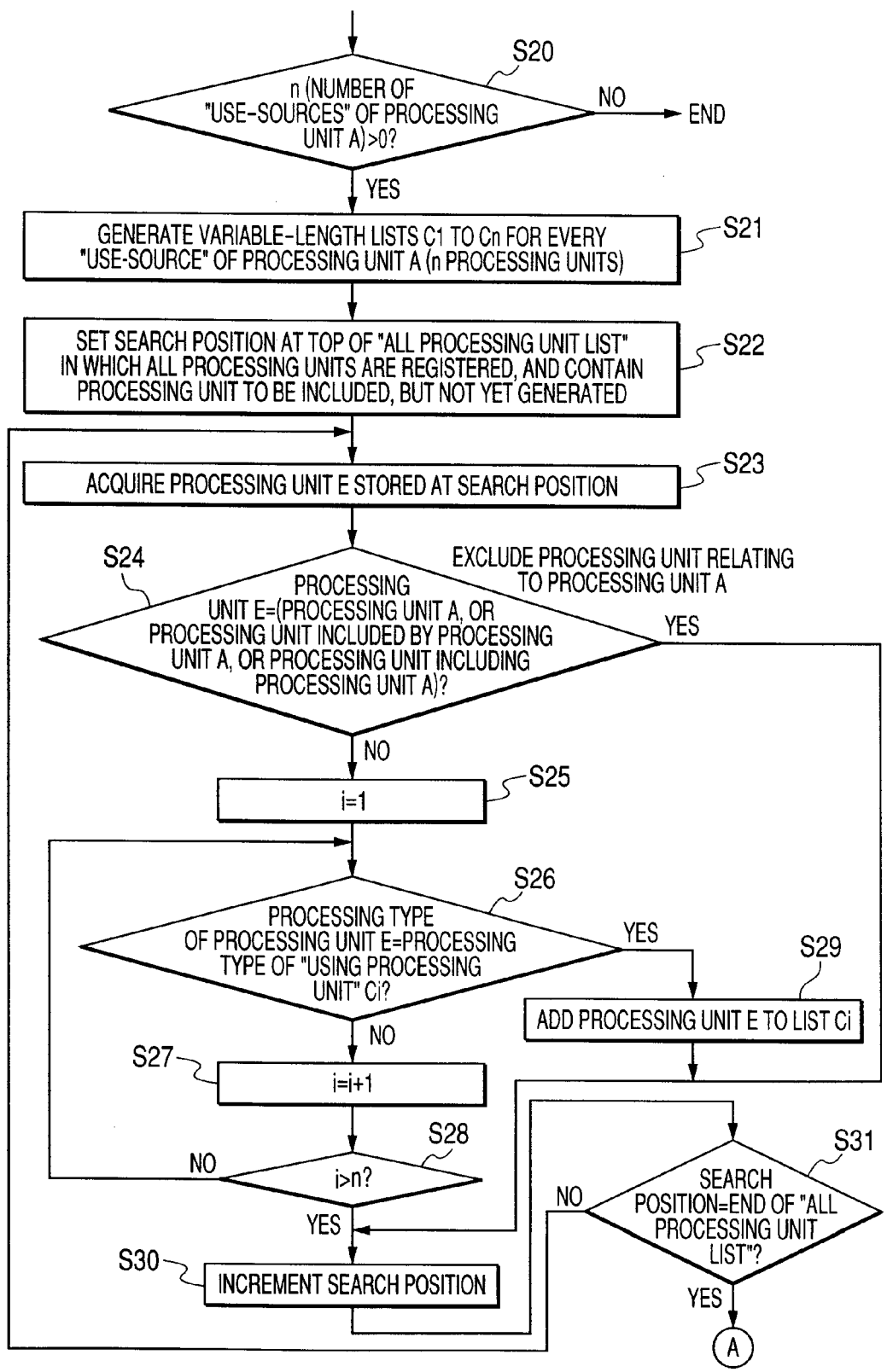
FIG. 25 is flowchart (1) showing a search for a use-source.
Figure 26:
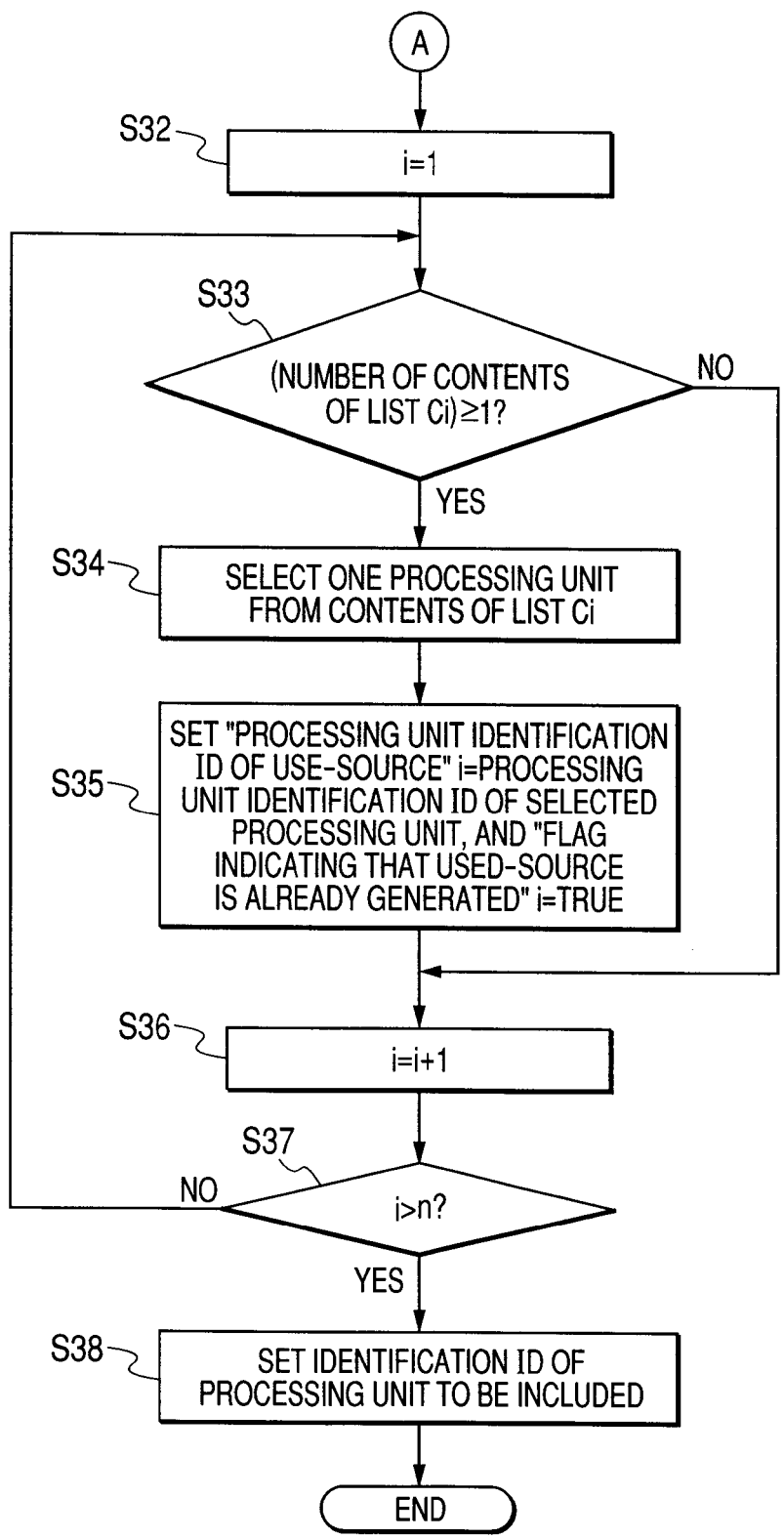
FIG. 26 is flowchart (2) showing a search for the use-source.

FIGS. 25 and 26 are flowcharts showing the search for the using processing units (use-source). Here, usable processing units are automatically associated, whereby the work efficiency is enhanced. First, whether or not n (a number of "use-sources" of the processing unit A)>0 is determined (step S20). If the determination result is NO, the process is terminated.

On the other hand, if the determination result is YES, variable-length lists C1 to Cn are generated for every "use-source" of the processing unit A (n processing units) (step S21). Next, a search position is set at the top of an "all processing unit list" in which all the processing units are registered, and a processing unit which is to be included (include-source), but not yet generated is contained in the "all processing unit list" (step S22), so as to also associate the processing unit A appropriately with an incomplete processing unit which is in the editing-halt state. In doing so, the processing unit A can use the processing unit included in the processing unit in the editing-halt state, and the processing unit used by the processing unit in the editing-halt state.

Next, a processing unit E stored at the search position is acquired (step S23). Next, the processing unit0 relating to the processing unit A itself is excluded., and processing unit E=(processing unit A or processing unit included by processing unit A or processing unit including processing unit A) is determined (the processing unit relating to the processing unit A itself is excluded) (step S24). If the determination result is NO, i=1 is set (step S25).

Next, processing type of processing unit E=processing type of "using processing unit (use-source)" Ci is determined (step S26). If the determination result is YES, the processing unit E is added to the list Ci (step S29). On the other hand, if the determination result is NO, i=i+1 is set (step S27), i>n is determined (step S28), the search position is incremented (step S30), and search position=end of "all processing unit list" is determined (step S31). If the determination result is NO, the process returns to step S23.

On the other hand, if the determination result is YES, i=1 is set (step S32), and (number of contents of list Ci)>1 is determined (step S33). If the determination result is YES, one of the contents of the list Ci is selected (step S34). The selected content may be the processing unit firstly added to the list, the processing unit used by the other processing unit, any complete processing unit, the last processing unit operated by the user, or any other processing unit.

Next, "processing unit identification ID of use-source" i=processing unit identification ID of the selected processing unit, and "flag indicating that use-source is already generated" i=true are set (step S35), and i=i+1 is set (step S36). Next, i>n is determined (step S37). If the determination result is NO, the process returns to step S33. On the other hand, if the determination result is YES, the identification ID of the processing unit to be included (include-source) is set (step S38) so as to make it possible to construct the use relationship even when the include-source is an incomplete processing unit which is unset and is in the editing-halt state.

Figure 27:
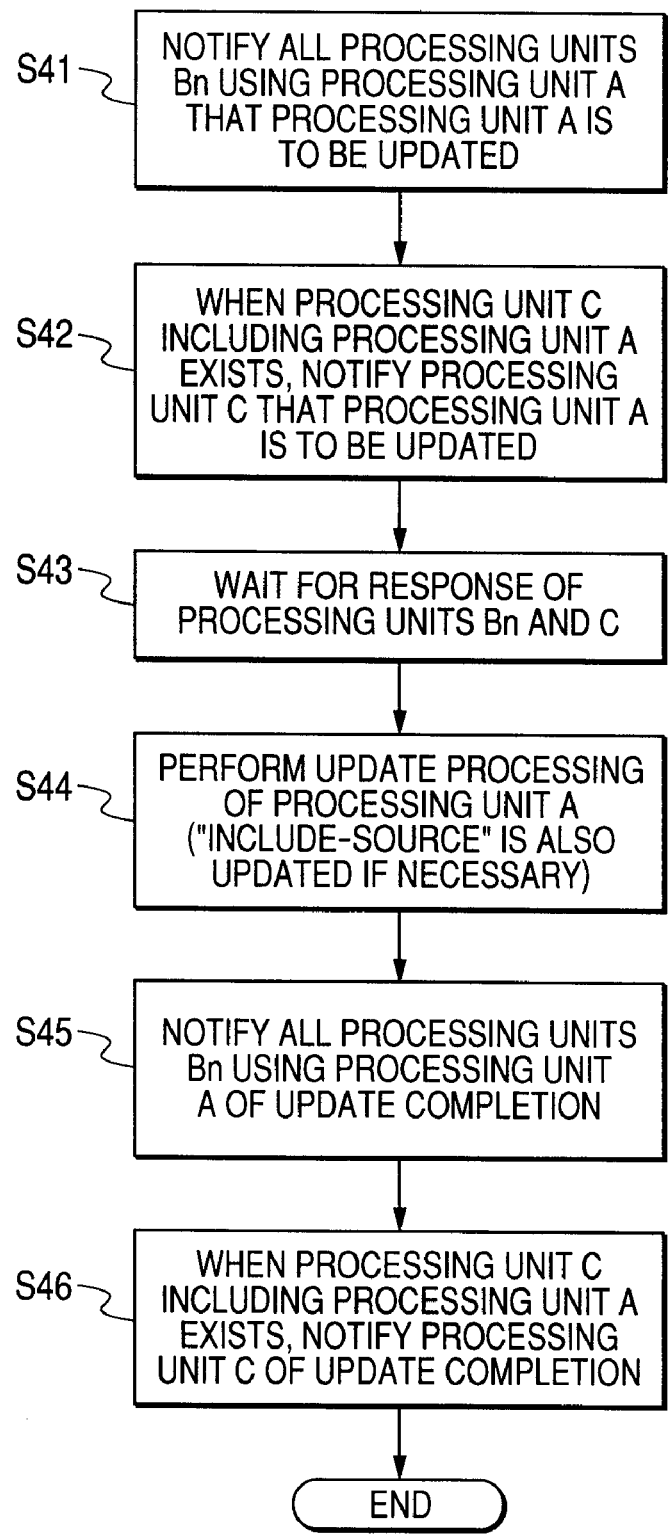
FIG. 27 is a flowchart showing processing when a processing unit is updated.

FIG. 27 is a flowchart showing processing when a processing unit is updated. When the processing unit A is to be updated, at first, all processing units Bn (use-destination) using the processing unit A (use-source) are notified that the processing unit A is to be updated (step S41), and when processing unit C (include-destination) including the processing unit A (include-source) exists, the processing unit C is notified that the processing unit A is to be updated (step S42). This processing when the processing unit is to be updated is performed so as to notify other processing units that the processing unit makes a transition to the "editing-complete"

state or the "editing-halt" state. In doing so, it is made possible for other processing units to use the processing unit in the "editing-halt" state. When the processing unit performs a simple processing, update processing may be performed on the processing unit even if the state of that processing unit is "editing."

Next, the process waits for response of the processing units Bn and C (step S43), and the update processing of the processing unit A is performed ("include-source" of the processing unit A is also updated if necessary) (step S44). Next, all the processing units Bn using the processing unit A are notified of completion of the update processing (step S45), and when processing unit C including the processing unit A exists, the processing unit C is notified of the completion of the update processing (step S46).

Figure 28:
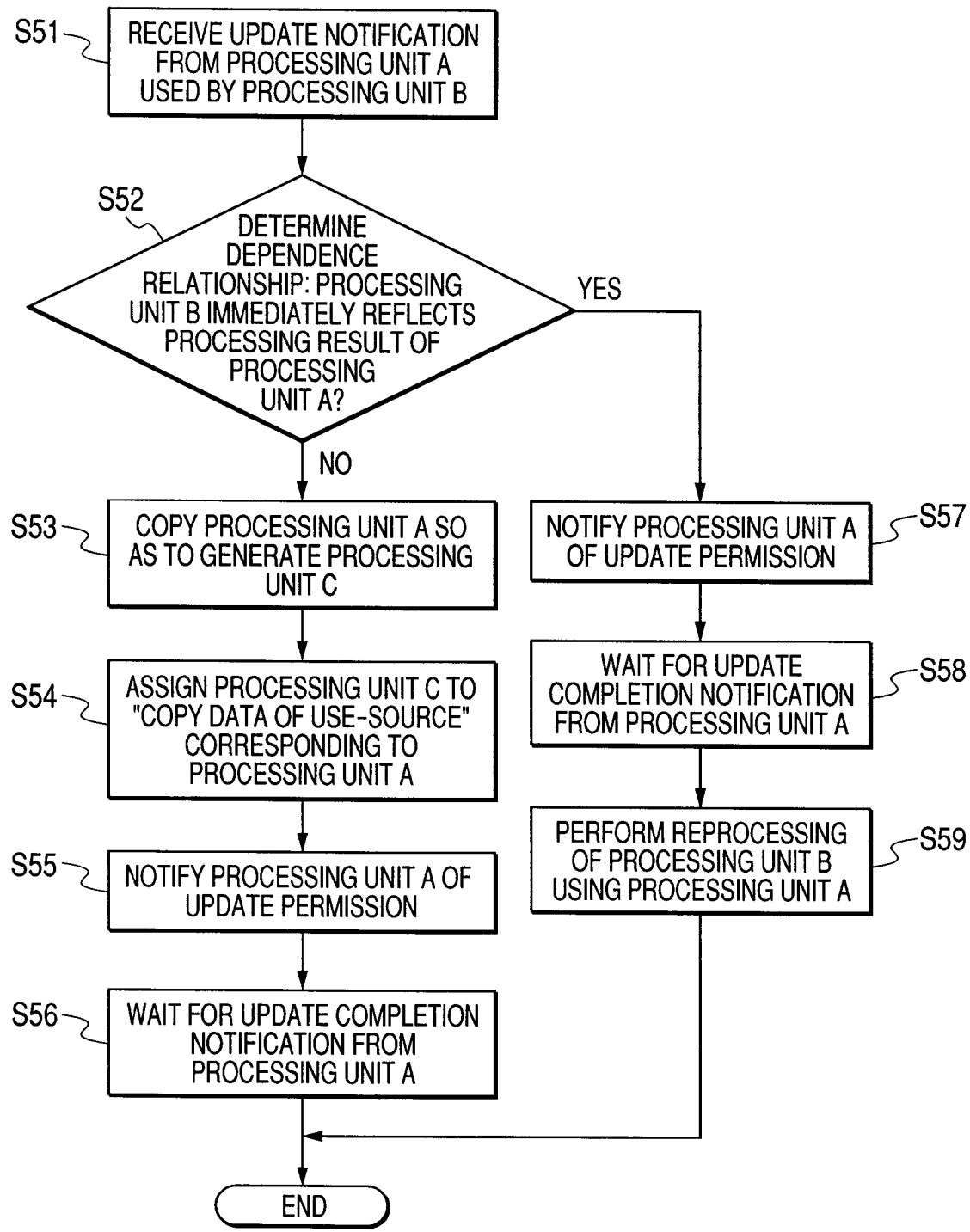
FIG. 28 is a flowchart showing processing when a use-source is updated.

FIG. 28 is a flowchart showing processing when a using processing unit (use-source) is updated. When the processing unit A (use-source) used by the processing unit B (use-destination) is updated, the processing unit B receives update notification from the processing unit A used by the processing unit B (step S51). Then, dependence relationship is determined, namely, whether or not the processing unit B immediately reflects the processing result of the processing unit A is determined (step S52).

If the determination result is NO, the processing unit A is copied so as to generate processing unit C (step S53), and the processing unit C is assigned to "copy data of use-source" corresponding to the processing unit A (step S54) Next, the processing unit A is notified of update permission (step S55), and the process waits for update completion notification from the processing unit A (step S56).

On the other hand, if the determination at step S52 is YES, the processing unit A is notified of the update permission (step S57), the process waits for the update completion notification from the processing unit A (step S58), and reprocessing of the processing unit B is performed using the processing unit A (step S59).

Figure 29:
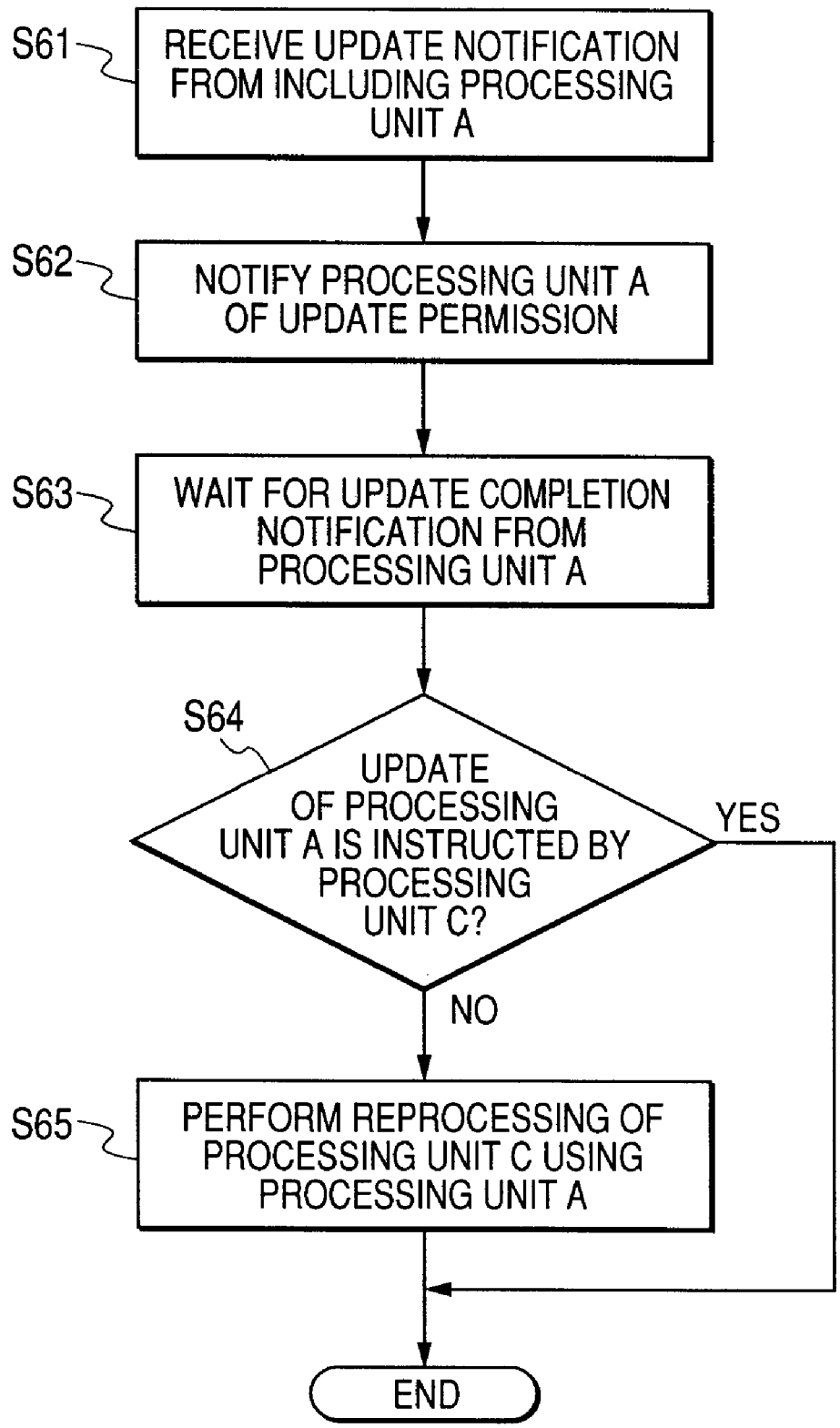
FIG. 29 is a flowchart showing processing when an include-source is updated.

FIG. 29 is a flowchart showing processing when an including processing unit (include-source) is to be updated. When the processing unit A (include-source) included by the processing unit C (include-destination) is to be updated, update notification is received from the including processing unit A (step S61), and the processing unit A is notified of update permission (step S62). Then, the process waits for update completion notification from the processing unit A (step S63).

Next, whether or not the update of the processing unit A is instructed by the processing unit C is determined (step S64). If the determination result is NO, reprocessing of the processing unit C is performed using the processing unit A (step S65).

Figure 30:
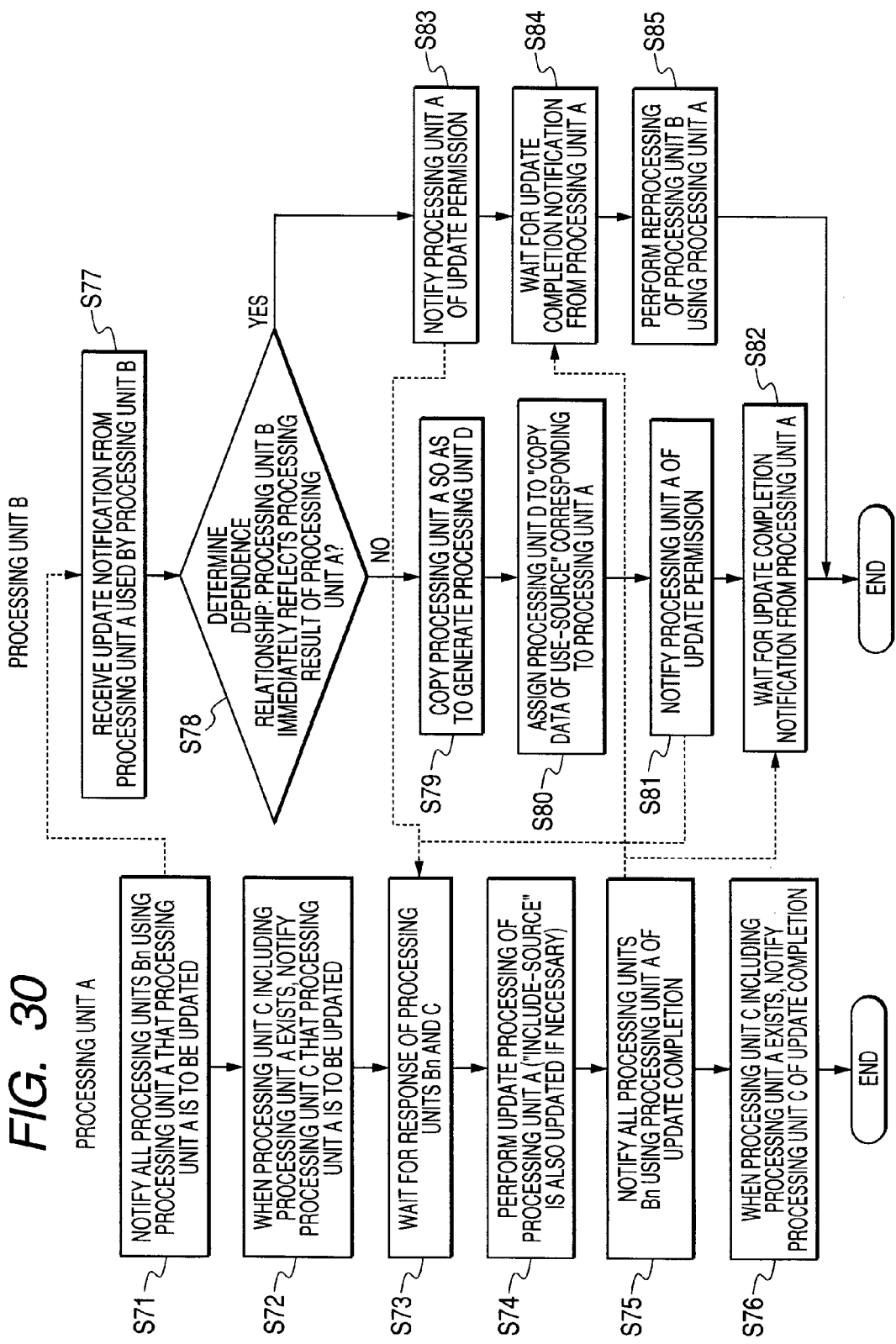
FIG. 30 is a flowchart (1) with two flowcharts arranged side by side.

FIG. 30 is a flowchart (1) with two flowcharts in FIG. 27 and FIG. 28 arranged side by side. When the processing unit A is to be updated, all processing units Bn (use-destination) using the processing unit A (use-source) are notified that the processing unit A is to be updated (step S71), and when processing unit C (include-destination) including the processing unit A (include-source) exists, the processing unit C is notified that the processing unit A is to be updated (step S72).

Next, the process waits for response of the processing units Bn and C (step S73), and the update processing of the processing unit A is performed ("include-source" of the processing unit A is also updated if necessary) (step S74). Next, all the processing units using the processing unit A are notified of completion of the update processing (step S75), and when processing unit C including the processing unit A exists, the processing unit C is notified of the completion of the update processing (step S76).

On the other hand, the processing unit B (use-destination) receives update notification from the processing unit A (use-source) used by the processing unit B (step S77), and dependence relationship is determined. That is, whether or not the processing unit B immediately reflects the processing result of the processing unit A is determined (step S78).

If the determination result is NO, the processing unit A is copied so as to generate processing unit D (step S79), and the processing unit D is assigned to "copy data of use-source" corresponding to the processing unit A (step S80). Next, the processing unit A is notified of update permission (step S81), and the process waits for update completion notification from the processing unit A (step S82).

On the other hand, if the determination at step S78 is YES, the processing unit A is notified of the update permission (step S83), and the process waits for the update completion notification from the processing unit A (step S84). Then, reprocessing of the processing unit B is performed using the processing unit A (step S85).

Figure 31:
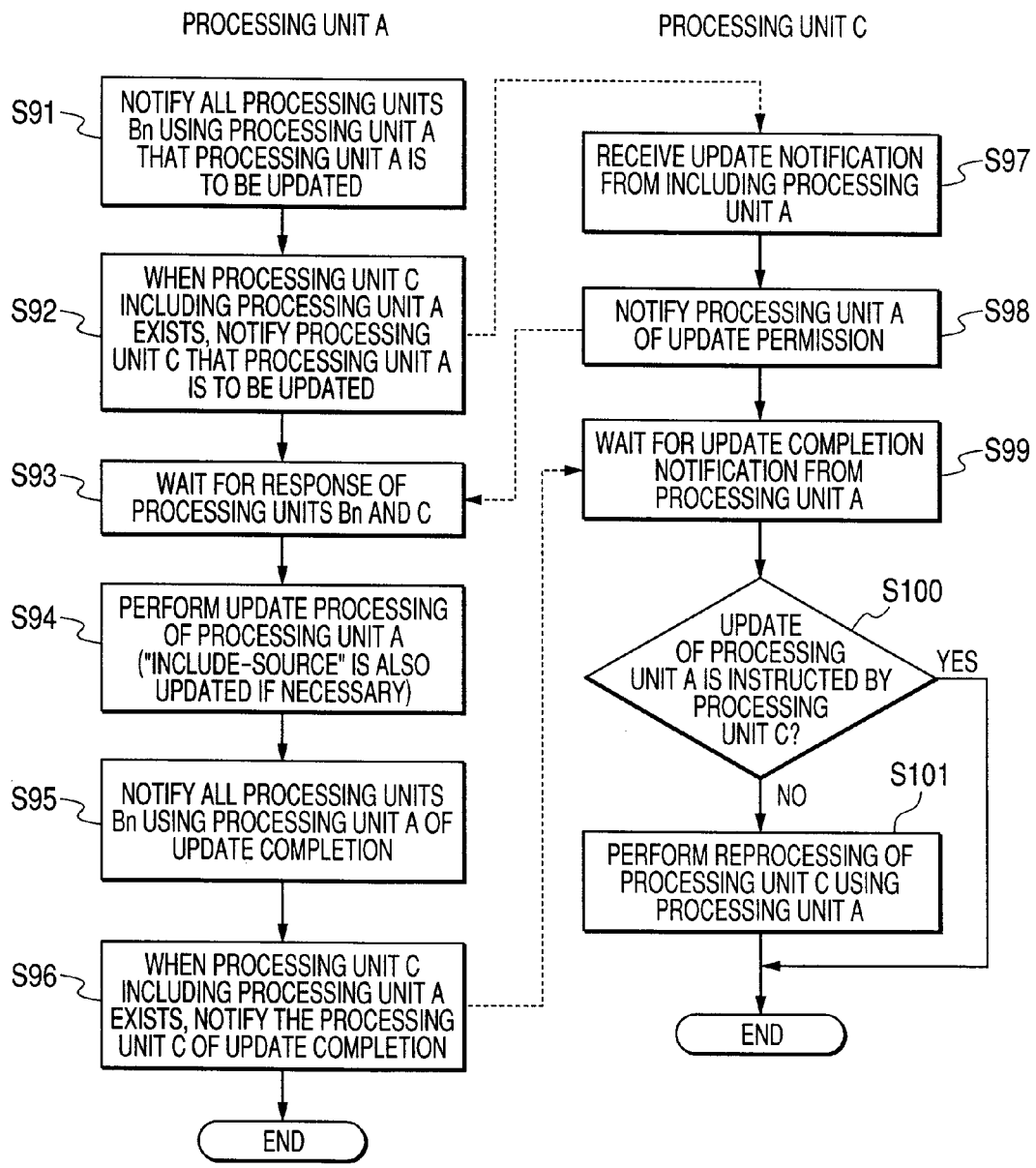
FIG. 31 is a flowchart (2) with two flowcharts arranged side by side.

FIG. 31 is a flowchart (2) with two flowcharts in FIG. 27 and FIG. 29 arranged side by side. When the processing unit A is to be updated, all processing units Bn (use-destination) using the processing unit A (use-source) are notified that the processing unit A is to be updated (step S91), and when processing unit C (include-destination) including the processing unit A (include-source) exists, the processing unit C is notified that the processing unit A is to be updated (step S92).

Next, the process waits for response of the processing units Bn and C (step S93), and the update processing of the processing unit A is performed ("include-source" of the processing unit A is also updated if necessary) (step S94). Next, all the processing units Bn using the processing unit A are notified of completion of the update processing (step S95), and when processing unit C including the processing unit A exists, the processing unit C is notified of the completion of the update processing (step S96).

On the other hand, in the processing unit C, update notification is received from the including processing unit A (step S97), and the processing unit A is notified of update permission (step S98). Next, the process waits for update completion notification from the processing unit A (step S99).

Next, whether or not the update of the processing unit A is instructed by the processing unit C is determined (step S100). If the determination result is NO, reprocessing of the processing unit C is performed using the processing unit A (step S101).

Figure 32:
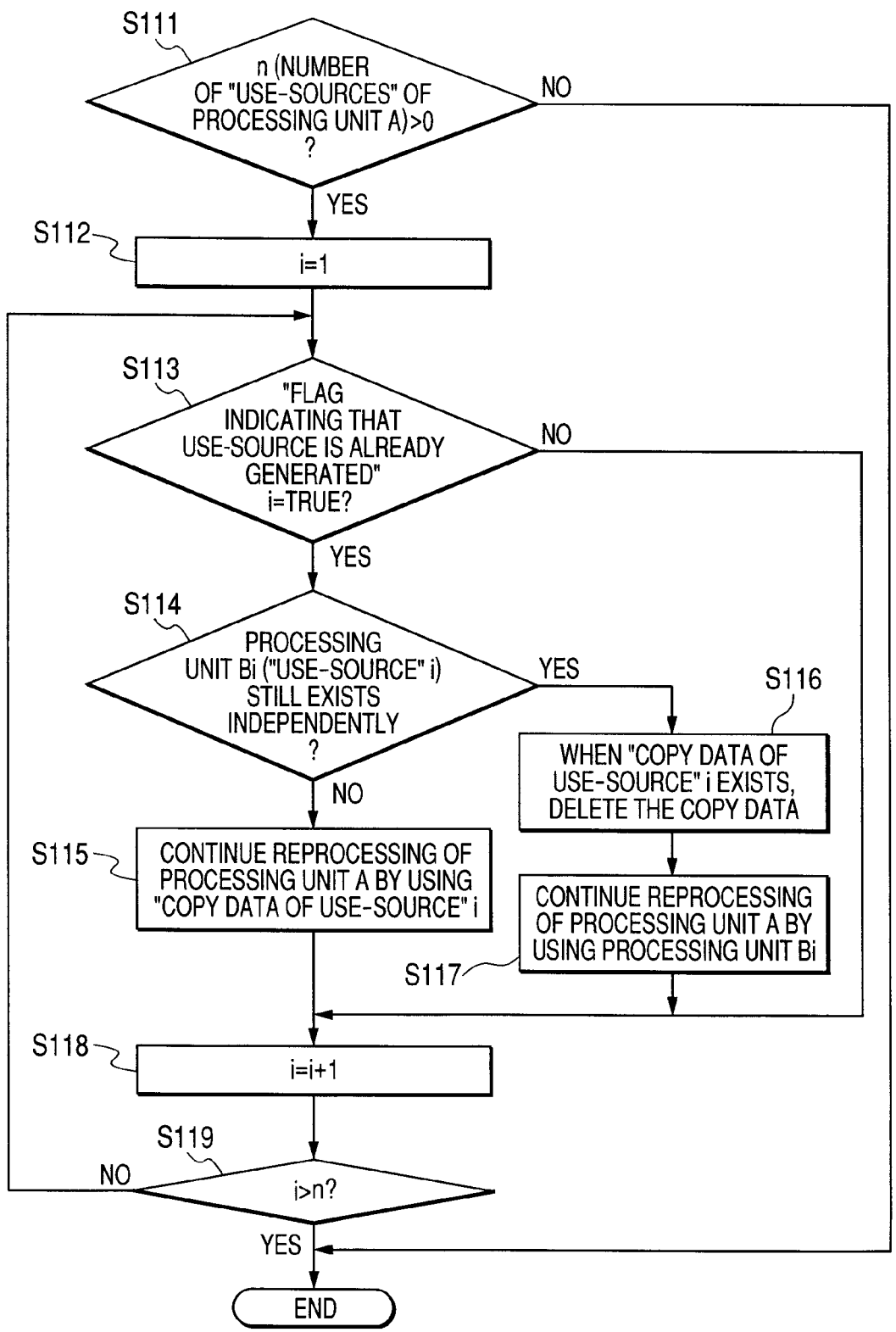
FIG. 32 is a flowchart showing processing of forcibly reflecting information of a use-source.

FIG. 32 is a flowchart showing processing of forcibly reflecting information of a using processing unit (use-source) This processing is processing of reflecting information of processing unit Bn (use-sources) used by the processing unit A (use-destination) in the processing unit A (update processing). First, whether or not n (number of "use-sources" of the processing unit A)>0 is determined (step S111). If the determination result is YES, i=1 is set (step S112), and whether or not "flag indicating that the use-source is already generated" i=true is determined (step S113).

If the determination result is YES, whether or not the processing unit Bi (the "use-source" i) still exists independently is determined (step S114). If the determination result is NO, reprocessing of the processing unit A is continued using "copy data of use-source" i (step S115).

On the other hand, if the determination result is YES, when the "copy data of use-source" i exists, it is deleted (step S116), and reprocessing of the processing unit A is continued using the processing unit Bi (step S117). Next, i=i+1 is set (step S118), and i>n is determined (step S119). If the determination result is NO, the process returns to step S113.

Figure 33:
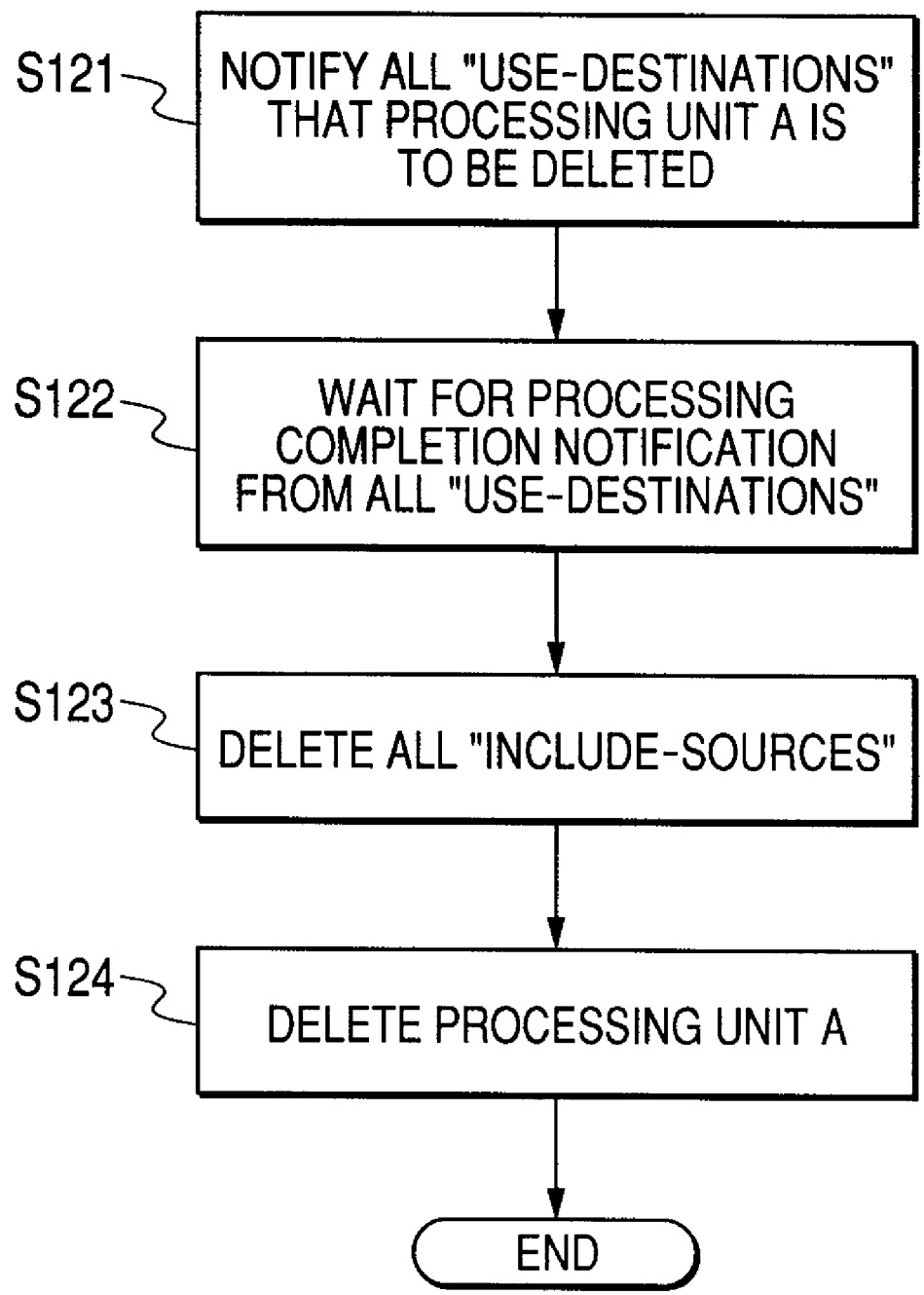
FIG. 33 is a flowchart showing processing when a processing unit is to be deleted.

FIG. 33 is a flowchart showing processing when a processing unit is to be deleted. When the processing unit A (use-source) is to be deleted, all "use-destinations" of the processing unit A are notified that the processing unit A is to be deleted (step S121), and the process waits for processing completion notification from all the "use-destinations" (step S122). In step S121, "use-destinations" of the "processing units (include-destinations) included by the processing unit A" are also notified that the processing unit A is to be deleted. Next, all "including processing units (include-sources)" of the processing unit A (include-destination) are deleted (step S123). Then, the processing unit A is deleted (step S124).

Figure 34:
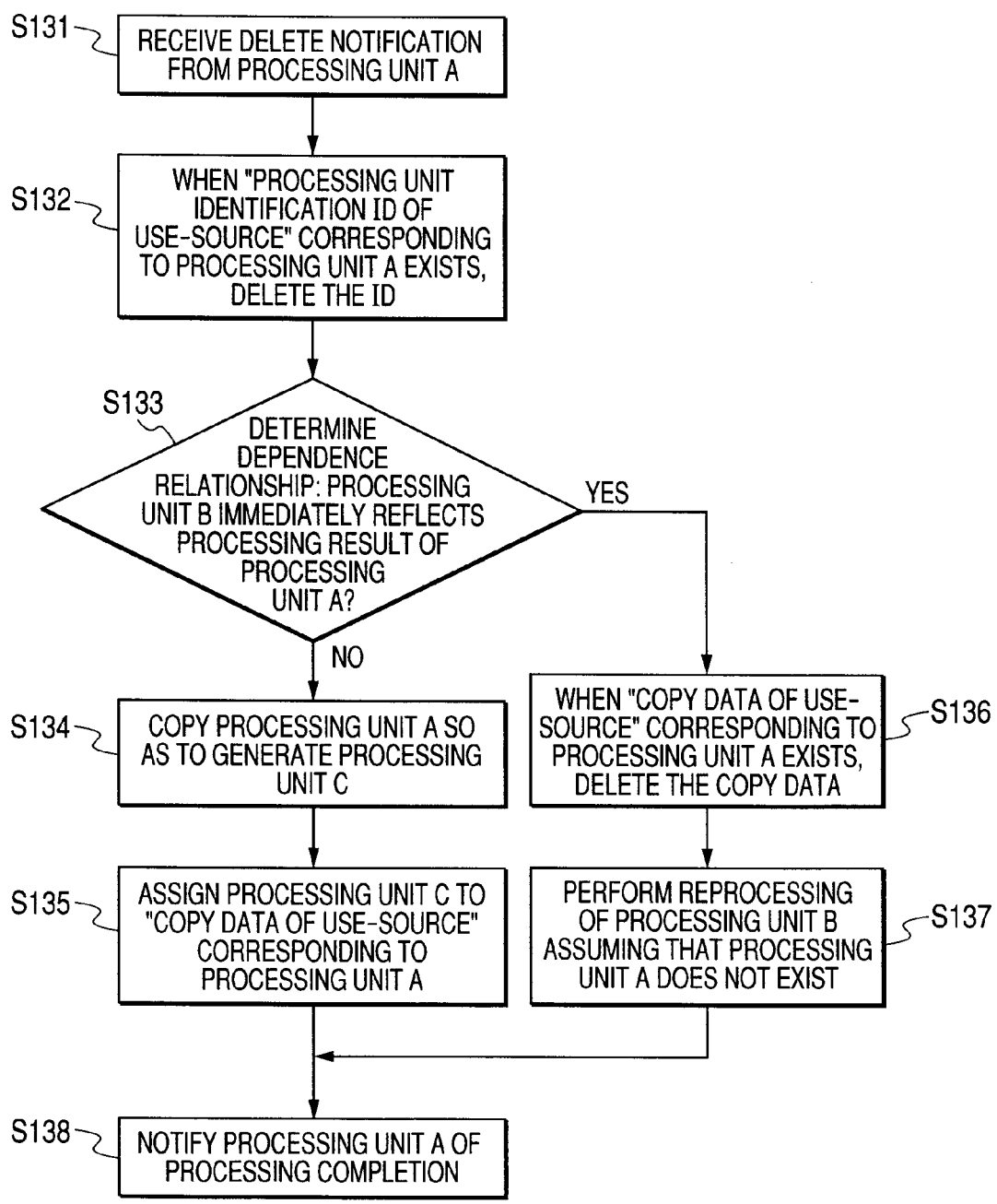
FIG. 34 is a flowchart showing processing when a use-source is to be deleted.

FIG. 34 is a flowchart showing processing when a using processing unit (use-source) is to be deleted. When the processing unit A (use-source) used by the processing unit B (use-destination) is to be deleted, processing unit B receives a delete notification from the processing unit A (step S131), and when the "processing unit identification ID of the use-source" corresponding to the processing unit A exists, that identification ID is deleted (step S132).

Next, the dependence relationship is determined. That is, whether or not the processing unit B immediately reflects the processing result of the processing unit A is determined (step S133). If the determination result is NO, the processing unit A is copied so as to generate a processing unit C (step S134), and the processing unit C is assigned to the "copy data of use-source" corresponding to the processing unit A (step S135).

On the other hand, if the determination result is YES, the "copy data of use-source" corresponding to the processing unit A is deleted if it exists (step S136). Reprocessing of the processing unit B is performed assuming that the processing unit A does not exist (step S137). Then, the processing unit A is notified of processing completion (step S138).

Figure 35:
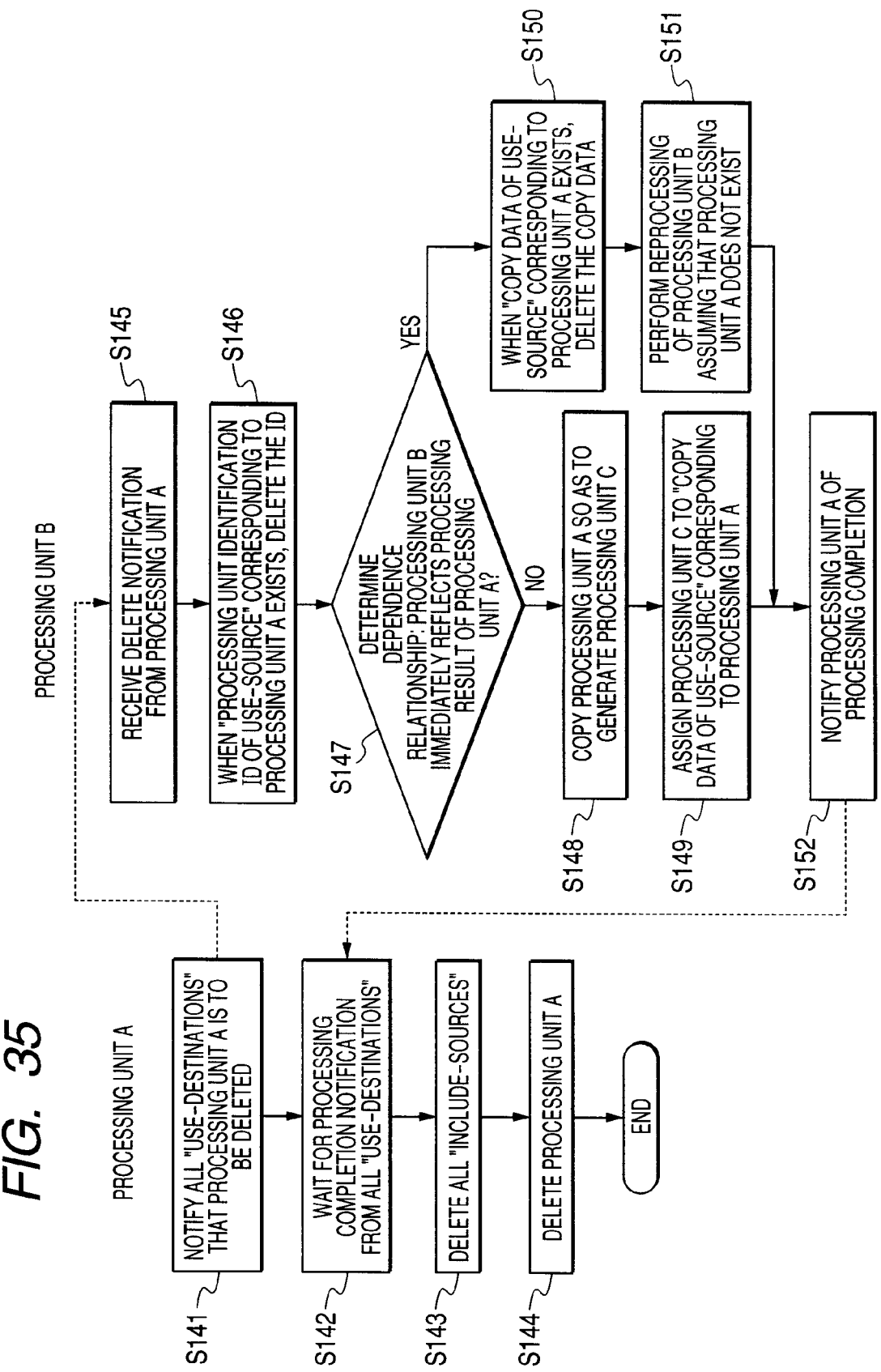
FIG. 35 is a flowchart with two flowcharts arranged side by side.

FIG. 35 is a flowchart with two flowcharts in FIG. 33 and FIG. 34 arranged side by side. When the processing unit A (use-source) is to be deleted, all "use-destinations" of the processing unit A are notified that the processing unit A is to be deleted (step S141), and the process waits for processing completion notification from all the "use-destinations" (step S142). Next, all "including processing units (include-sources)" of the processing unit A (include-destination) are deleted (step S143), and the processing unit A is deleted (step S144).

On the other hand, the processing unit B receives a delete notification from the processing unit A (step S145), and when the "processing unit identification ID of the use-source" corresponding to the processing unit A exists, that identification ID is deleted (step S146).

Next, the dependence relationship is determined. That is, whether or not the processing unit B immediately reflects the processing result of the processing unit A is determined (step S147). If the determination result is NO, the processing unit A is copied so as to generate the processing unit C (step S148), and the processing unit C is assigned to the "copy data of use-source" corresponding to the processing unit A (step S149).

On the other hand, if the determination result is YES, "copy data of use-source" corresponding to the processing unit A is deleted if it exists (step S150). Reprocessing of the processing unit B is performed assuming that the processing unit A does not exist (step S151). Then, the processing unit A is notified of processing completion (step S152).

Figure 36:
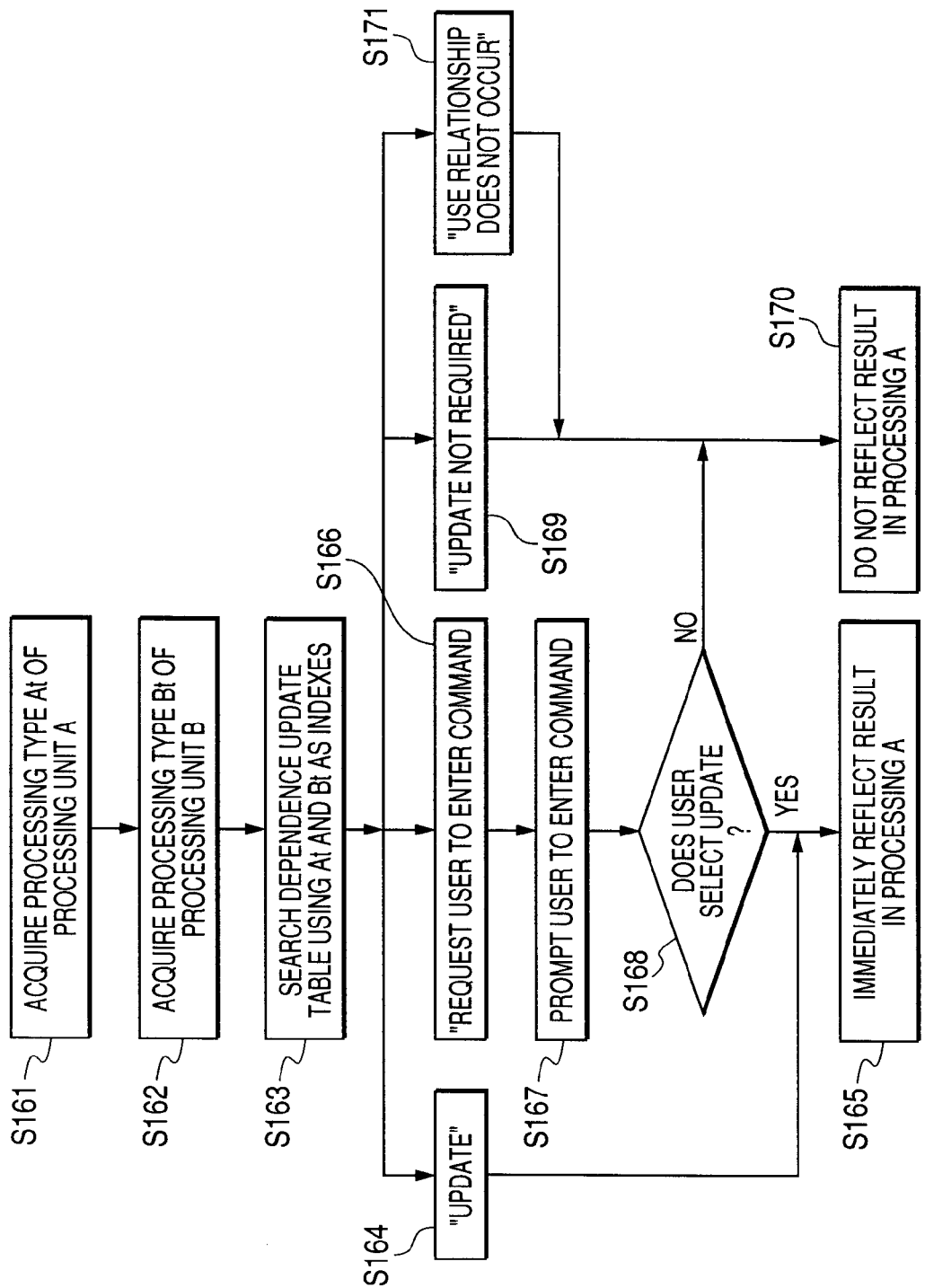
FIG. 36 is a flowchart showing dependence relationship determination processing in a fourth embodiment.
Figure 38:
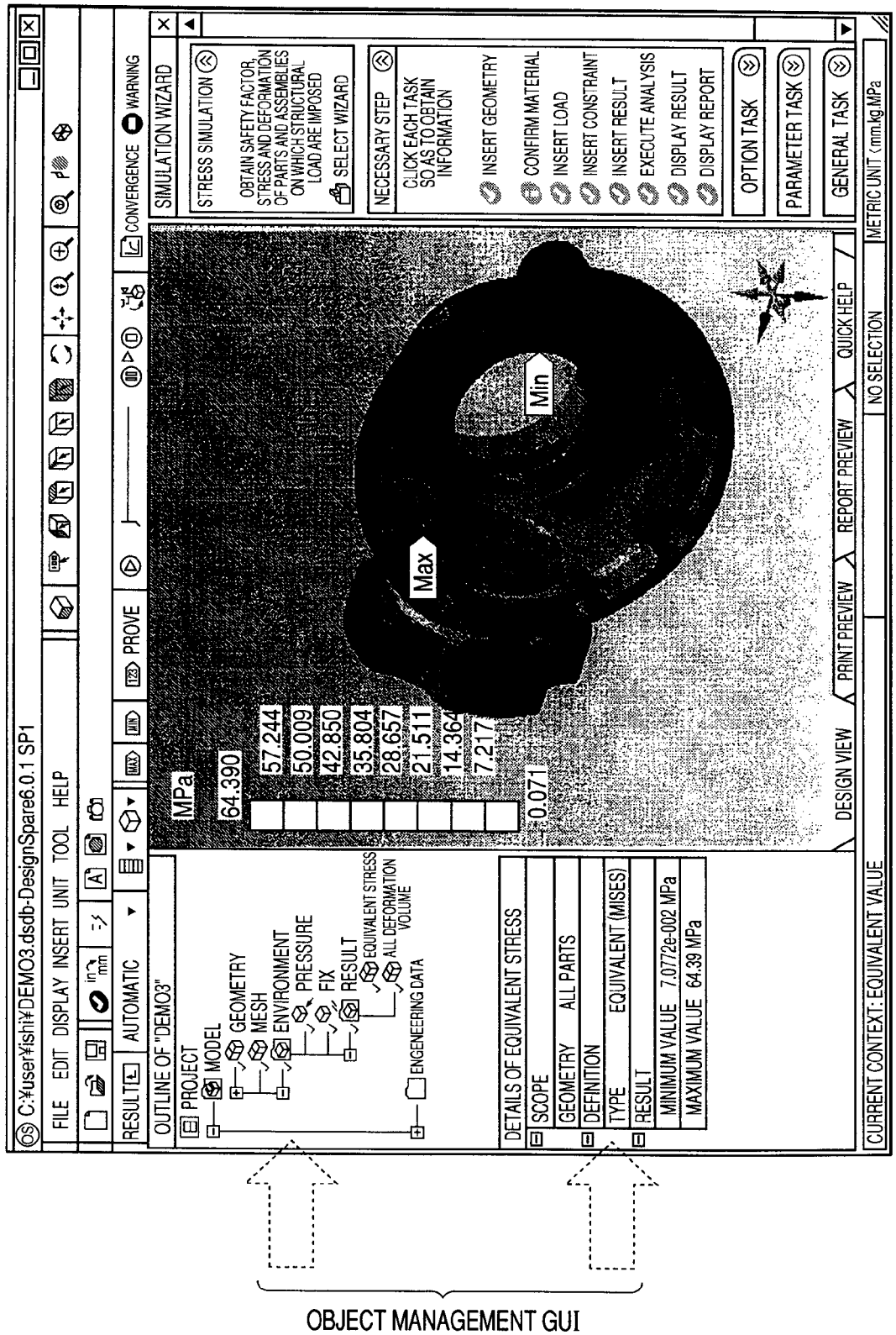
FIG. 38 is a drawing showing an example of stress simulation by image processing in a related art.

FIG. 36 is a flowchart showing dependence relationship determination processing in this embodiment. This is the processing of determining whether or not the result is immediately reflected in the processing A when the processing unit B (use-source) used by the processing unit A (use-destination) is updated. First, a processing type At of the processing unit A is acquired (step S161), and a processing type Bt of the processing unit B is acquired (step S162).

Next, a dependence update table is searched using At and Bt as indexes (step S163). In a case of "update" (step S164), the result is immediately reflected in the processing A (step S165). On the other hand, in a case of "request user to enter command" (step S166), the process prompts the user to enter a command (step S167), and whether or not the user selects update is determined (step S168). If the determination result is YES, the result is immediately reflected in the processing A (step S165). If the determination result is NO, the result is not reflected in the processing A (step S170).

In a case of "update not required" (step S169), the result is not reflected in the processing A (step S170). In a case of "use relationship does not occur" (step S171), processing is not performed. Further, more diversified determinations may be made in response to the state of the processing B and the state of the processing A.

FIG. 37 shows an example of the dependence update table (use relationship) in the embodiment. Here, "YES" is indicated as "update," "NO" is indicated as "update not required," "OPTIONAL" is indicated as "request user to enter command," and "•" indicated as "use relationship does not occur." Another similar table may be used as the dependence update table when the use-source is to be deleted.

The embodiments of the invention can be also achieved by a computer readable medium in which a program code (an executable program, an intermediate code program, and a source program) according to the above described image processing method is stored so that a computer can read it, and by allowing the computer (or a CPU or an MCU) to read out the program (software) stored in the storage medium and to execute it.

The computer readable medium includes, for example, a tape-type medium, such as a magnetic tape or a cassette tape, a disc-type medium including a magnetic disc, such as a floppy (a registered trademark) disc or a hard disc, and an optical disc, such as CD-ROM/MO/MD/DVD/CD-R, a card-type medium, such as an IC card (including a memory card) or an optical card, and a semiconductor memory, such as a mask ROM, an EPROM, an EEPROM, or a flash ROM.

Further, a computer may be constituted such that it can be connected to a communication network, and the program may be supplied thereto through the communication network. The communication network includes, for example, the Internet, the Intranet, an intranet, an extranet, a LAN, an ISDN, a VAN, a CATV communication network, a virtual private network, telephone lines, a mobile communication network, and a satellite communication network. A transmission medium for constituting the communication network includes, for example, wire lines, such as IEEE1394, USB, power lines, cable TV lines, telephone lines, and ADSL lines, infrared rays, such as IrDA or a remote controller, and wireless lines, such as Bluetooth (a registered trademark), 802.11 Wireless, HDR, a mobile communication network, satellite lines, and a terrestrial digital broadcasting network. In addition, the program may be incorporated into carrier waves and then transmitted in the form of computer data signals.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An image processing method of managing a plurality of processes using volume data as a plurality of processing units for each processing type, the image processing method comprising:

managing relationships among the plurality of processing units, wherein the plurality of processing units can respectively take at least an editing-halt state, an editing state and an editing-complete state, and wherein while a first processing unit of the plurality of processing units is in the editing-halt state, a second processing unit of the plurality of processing units takes the editing state and the second processing unit uses parameters of the first processing unit, and then the first processing unit takes the editing state.

2. The image processing method as claimed in claim 1, wherein a number of processing units of the plurality of processing units in the editing state is equal to or less than a predetermined number.

3. The image processing method as claimed in claim 1, wherein in a case where a third processing unit of the plurality of processing units includes the first processing unit, and the second processing unit uses the first processing unit, the second processing unit uses the third processing unit so as to use the first processing unit.

4. The image processing method as claimed in claim 1, wherein in a case where a third processing unit of the plurality of processing units uses the first processing unit, and the second processing unit of the plurality of processing units uses the first processing unit, the second processing unit uses the third processing unit so as to use the first processing unit.

5. The image processing method as claimed in claim 1, wherein in a case where the first processing unit is modified, the second processing unit is modified based on the processing type of the first processing unit and the processing type of the second processing unit.

6. The image processing method as claimed in claim 1, wherein a result of at least one of the plurality of processing units is not displayed on a screen.

7. The image processing method as claimed in claim 1, wherein processing of a processing unit of the plurality of processing units is continued when the processing unit is in the editing-halt state.

8. The image processing method as claimed in claim 1, wherein in a case where the first processing unit includes a third processing unit of the plurality of processing units, and the first processing unit is in the editing-halt state, the second processing unit uses the first processing unit so as to use the third processing unit.

9. The image processing method as claimed in claim 1, wherein in a case where the first processing unit uses the second processing unit, and the first processing unit is in the editing-halt state, a third processing unit of the plurality of processing units uses the first processing unit so as to use the second processing unit.

10. The image processing method as claimed in claim 1, wherein in a case where the first processing unit is in the editing-halt state, a use relationship of the second processing unit with respect to the first processing unit is set.

11. The image processing method as claimed in claim 1, wherein in a case where the second processing unit uses the first processing unit, and the first processing unit is in the editing state, the second processing unit uses information of the first processing unit when an information request occurs in the second processing unit, and the information before editing operation of the first processing unit started is obtained.

12. The image processing method as claimed in claim 1, wherein a state of the processing unit is displayed on a screen.

13. A computer readable medium having a program including instructions for permitting a computer to manage a plurality of processes using volume data as a plurality of processing units for each processing type, said instructions comprising:

managing relationships among the plurality of processing units, wherein the plurality of processing units can respectively take at least an editing-halt state, an editing state and an editing-complete state, and wherein while a first processing unit of the plurality of processing units is in the editing-halt state, a second processing unit of the plurality of processing units takes the editing state and the second processing unit uses parameters of the first processing unit, and then the first processing unit takes the editing state.

* * * * *

UNITED STATES PATENT AND TRADEMARK OFFICE
CERTIFICATE OF CORRECTION

PATENT NO. : 7,623,695 B2
APPLICATION NO. : 11/457264
DATED : November 24, 2009
INVENTOR(S) : Kazuhiko Matsumoto It is certified that error appears in the above-identified patent and that said Letters Patent is hereby corrected as shown below:

Column 16, line 22, please replace the word "unit0" with --unit--,

Column 16, line 39, please replace ">" with --$\geq$--,

Column 17, line 28, please add a "." after the word "S54)" and before the word "Next".

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,623,695 B2 | Page 1 of 1 |
| APPLICATION NO. | : 11/457264 | |
| DATED | : November 24, 2009 | |
| INVENTOR(S) | : Kazuhiko Matsumoto | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 803 days.

Signed and Sealed this

Twenty-sixth Day of October, 2010

David J. Kappos
*Director of the United States Patent and Trademark Office*